(12) United States Patent
Kobayashi et al.

(10) Patent No.: US 9,936,139 B2
(45) Date of Patent: Apr. 3, 2018

(54) IMAGE PICKUP CONTROL APPARATUS, CONTROL METHOD THEREFOR, AND RECORDING MEDIUM

(71) Applicant: CANON KABUSHIKI KAISHA, Tokyo (JP)

(72) Inventors: Ryuichi Kobayashi, Tokyo (JP); Toshiaki Ueguri, Tokyo (JP); Emi Kondo, Tokyo (JP); Hiroshi Matsushima, Machida (JP); Hiroshi Nakamura, Tokyo (JP); Yutaka Yamamoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/182,483

(22) Filed: Jun. 14, 2016

(65) Prior Publication Data

US 2016/0373655 A1 Dec. 22, 2016

(30) Foreign Application Priority Data

Jun. 18, 2015 (JP) .................................. 2015-122992

(51) Int. Cl.
*H04N 5/232* (2006.01)
*H04N 5/225* (2006.01)

(52) U.S. Cl.
CPC ....... *H04N 5/23293* (2013.01); *H04N 5/2256* (2013.01); *H04N 5/23212* (2013.01); *H04N 5/23216* (2013.01); *H04N 5/23222* (2013.01); *H04N 5/23245* (2013.01)

(58) Field of Classification Search
CPC ........... H04N 5/23293; H04N 5/23245; H04N 5/23222; H04N 5/23216; H04N 5/23212; H04N 5/2256
See application file for complete search history.

(56) References Cited

U.S. PATENT DOCUMENTS 7,034,881 B1 * 4/2006 Hyodo ................. H04N 5/2351
348/231.6
8,687,092 B2 * 4/2014 Hara ..................... G03B 17/02
348/231.6
8,913,176 B2 * 12/2014 Chun .................. G06F 3/04883
348/208.12

FOREIGN PATENT DOCUMENTS

JP 2002-152586 A 5/2002
JP 2004-128701 A 4/2004
JP 2013-017218 A 1/2013

* cited by examiner

*Primary Examiner* — Padma Haliyur
(74) *Attorney, Agent, or Firm* — Canon U.S.A. Inc., IP Division

(57) ABSTRACT

An image pickup control apparatus according to an exemplary embodiment of the present invention includes an instruction unit configured to instruct an image pickup unit to shoot an image in accordance with an operation of a photographer, a first display processing unit configured to display the image shot by the image pickup unit in accordance with an instruction by the instruction unit, an obtaining unit configured to obtain position information input by the photographer with respect to the image displayed by the first display processing unit, a second display processing unit configured to display options based on the position information obtained by the obtaining unit, and an assistance unit configured to perform an assistance for next shooting based on an option selected by the photographer from among the options displayed by the second display processing unit.

25 Claims, 21 Drawing Sheets

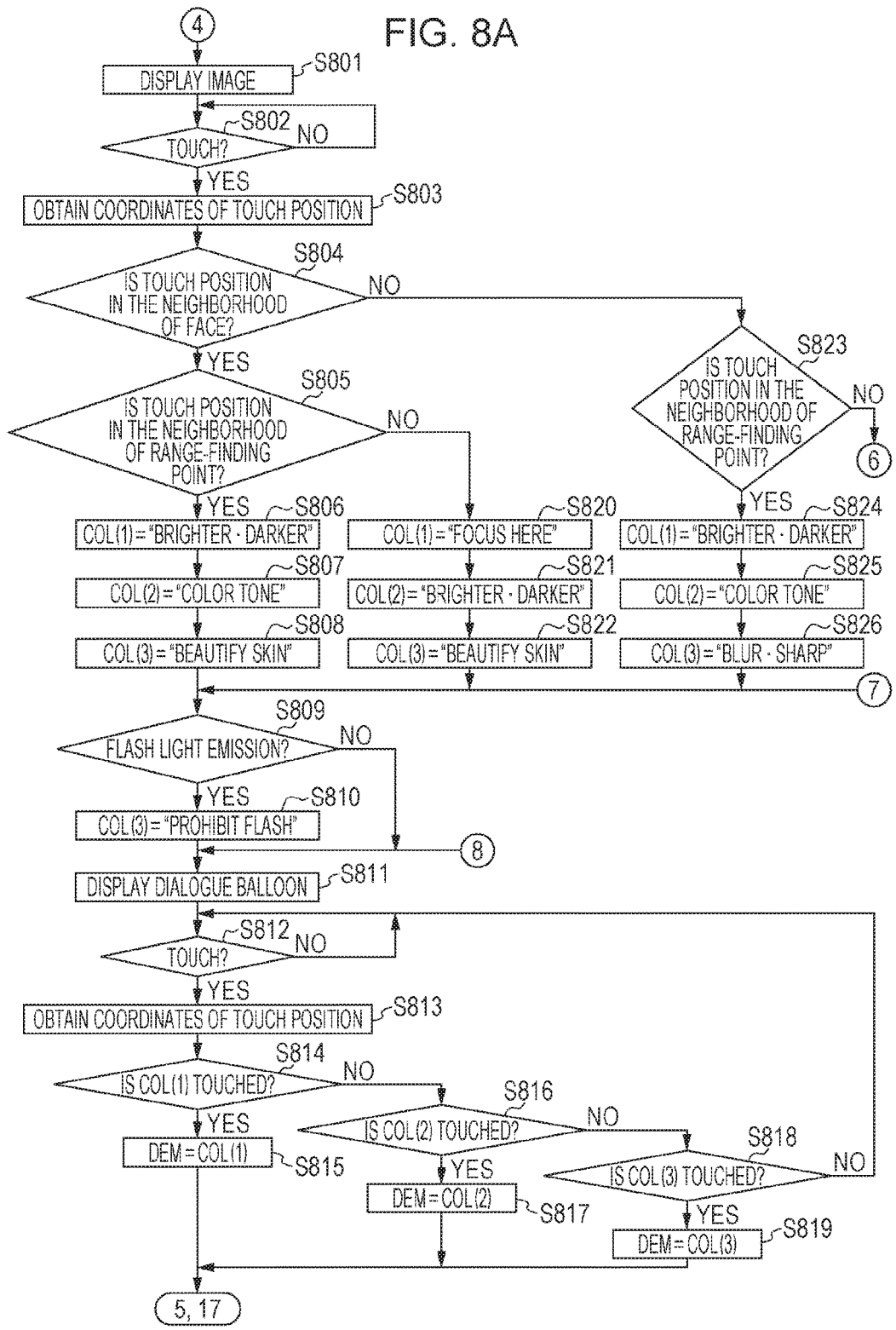

FIG. 9

| | FACE AND ALSO IN-FOCUS | FACE | IN-FOCUS POINT | WITHIN GOLDEN SECTION | SUNSET | CORNER | BLUE COLOR ON UPPER SIDE | GREEN | UPPER SIDE | OTHERS |
|---|---|---|---|---|---|---|---|---|---|---|
| FOCUS HERE | | 1 | | 1 | | | | | | |
| BLUR · SHARP | | | 4 | | | | | | | 1 |
| BRIGHTER · DARKER | 1 | 2 | 1 | 2 | 2 | 2 | 2 | 2 | 2 | 2 |
| MAKE SKY COLOR BLUE | | | | | | | 1 | | | |
| DEEPEN GREEN COLOR | | | | | | | | 1 | | |
| BEAUTIFY SKIN | 4 | 4 | | | | | | | | |
| COLOR TONE | 2 | 3 | 3 | 4 | 3 | 3 | 3 | 3 | 3 | 4 |
| PROHIBIT FLASH LIGHT EMISSION | 3 | | 2 | 3 | | | | | | 3 |
| CHANGE COLOR OF SUNSET | | | | | 1 | | | | | |
| BRIGHTER CORNER | | | | | | 1 | | | | |

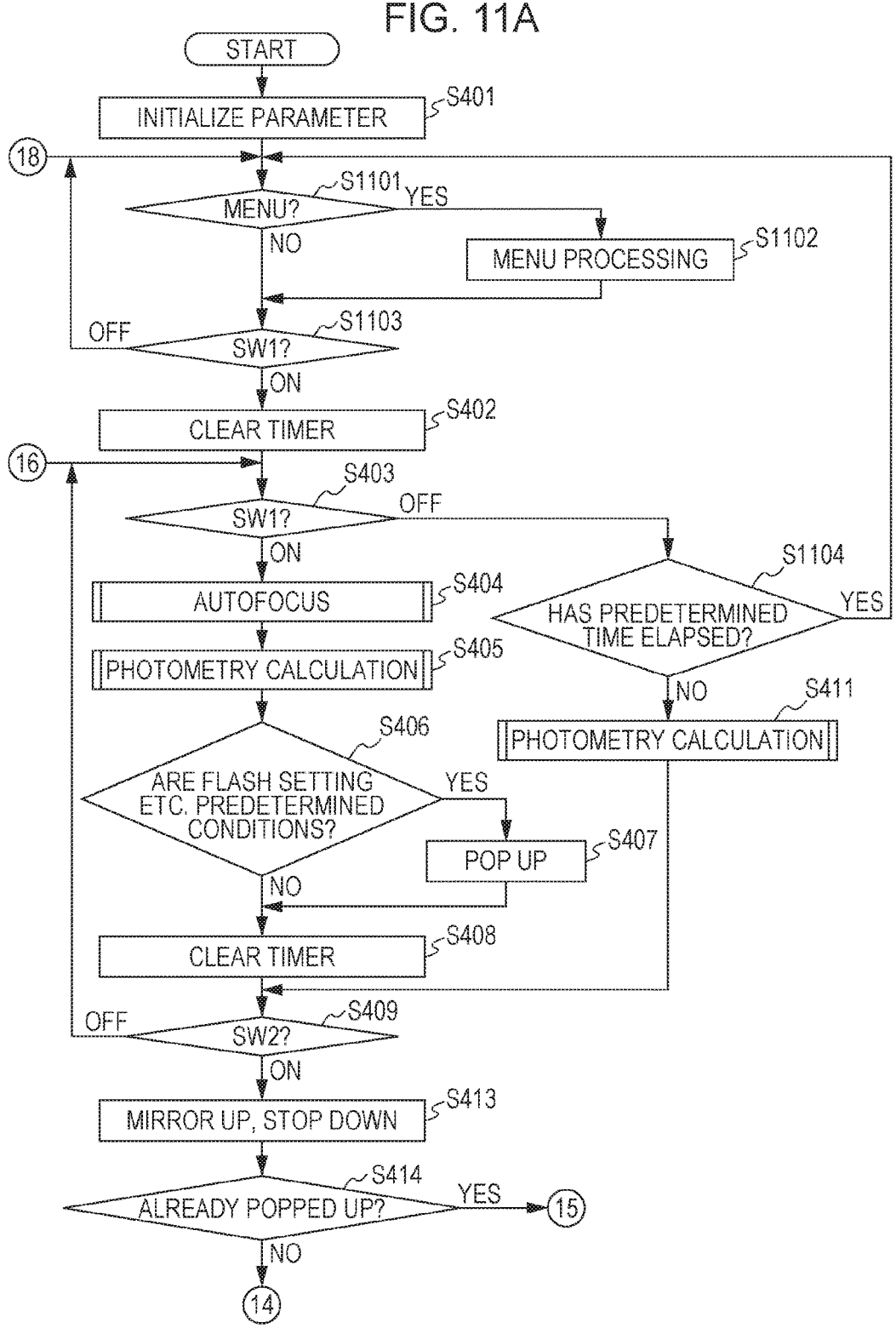

FIG. 12

| MENU | |
|---|---|
| RANGE-FINDING POINT | AUTO SELECT |
| SHOOTING MODE | PROGRAM |
| EXPOSURE CORRECTION AMOUNT | 0 |
| FLASH | AUTO LIGHT EMISSION |
| DEVELOPMENT PARAMETER | STANDARD |
| WHITE BALANCE | AWB |
| WHITE BALANCE CORRECTION AMOUNT | 0 |
| MARGINAL ILLUMINATION CORRECTION | OFF |

IMAGE PICKUP CONTROL APPARATUS, CONTROL METHOD THEREFOR, AND RECORDING MEDIUM

BACKGROUND OF THE INVENTION

Field of the Invention

The present invention relates to an image pickup control apparatus and a control method therefor.

Description of the Related Art

Among image pickup control apparatuses such as digital cameras, image pickup control apparatuses have been proposed which can provide a photographer an explanation on an operation method and functions, an advice on shooting, a search by way of help, or the like. However, these image pickup control apparatuses are supposed to be used by a photographer who understands functions and terms of the camera to some extent and are not particularly adequate to a beginner to use. That is, in a case where a shot image is not satisfactory, the beginner may understand that this image is different from a desired finish, but a problem occurs that the beginner does not understand how camera settings need to be changed.

Japanese Patent Laid-Open No. 2004-128701 discloses a shooting assistance method of selecting, from a relief information database that stores relief information indicating a method for an improvement to successfully perform shooting while being associated with failure camera control information, the relief information associated with the searched failure camera control information and providing the selected relief information.

Japanese Patent Laid-Open No. 2002-152586 discloses an electronic camera configured to set a shooting condition associated with a sample image selected from a plurality of sample images.

Japanese Patent Laid-Open No. 2013-17218 discloses an image pickup apparatus that displays image quality processing applied to image data when a range in a live view image where the image quality processing is desired to be performed is touched so that the selected image quality processing can be set.

However, according to the shooting assistance method of Japanese Patent Laid-Open No. 2004-128701, the failure camera control information needs to be associated with the relief information for each user, and the user needs to determine whether or not the image shot in the past is a failure. Therefore, according to the shooting assistance method of Japanese Patent Laid-Open No. 2004-128701, the relief information is not obtained until the failed image is accumulated.

In the electronic camera of Japanese Patent Laid-Open No. 2002-152586, it may take time to reach a desired sample image, or a sample image corresponding to a shooting situation may not exist in some cases. Thus, dissatisfaction with the shot image may not be eliminated in some cases.

In the image pickup apparatus of Japanese Patent Laid-Open No. 2013-17218, since the live view image is touched, even when the photographer does not feel the dissatisfaction with the live view image, the image after the shooting may not turn out an image with a desired finish because of flash light emission, image processing, or the like which is performed at the time of the shooting.

SUMMARY OF THE INVENTION

The present invention is aimed at obtaining an image on which a demand of a photographer with respect to an image after shooting is reflected.

An image pickup control apparatus according to an aspect of the present invention includes: an instruction unit configured to instruct an image pickup unit to shoot an image in accordance with an operation of a photographer; a first display processing unit configured to display the image shot by the image pickup unit in accordance with an instruction by the instruction unit; an obtaining unit configured to obtain position information input by the photographer with respect to the image displayed by the first display processing unit; a second display processing unit configured to display options based on the position information obtained by the obtaining unit; and an assistance unit configured to perform an assistance including at least one of setting of a parameter for next shooting and guidance display of a parameter related to shooting based on an option selected by the photographer from among the options displayed by the second display processing unit.

Further features of the present invention will become apparent from the following description of exemplary embodiments with reference to the attached drawings.

BRIEF DESCRIPTION OF THE DRAWINGS

FIGS. 8A to 8C are flow charts illustrating processing of the image pickup control apparatus.

FIG. 9 illustrates a relationship between a touch position and a demand of a photographer.

FIGS. 11A and 11B are flow charts illustrating processing of the image pickup control apparatus according to a second exemplary embodiment.

FIG. 12 illustrates a display example displayed on the display unit.

DESCRIPTION OF THE EMBODIMENTS

Hereinafter, exemplary embodiments of the present invention will be described in detail with reference to the accompanying drawings.

First Exemplary Embodiment

Figure 1A:
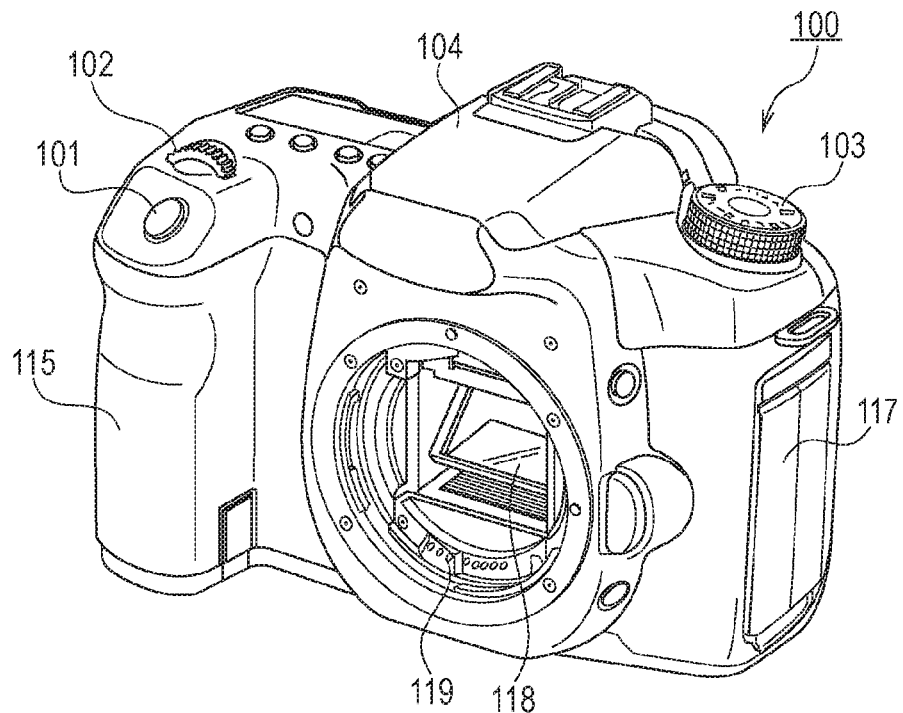
FIGS. 1A and 1B are an external appearance view of a digital camera.
Figure 1B:
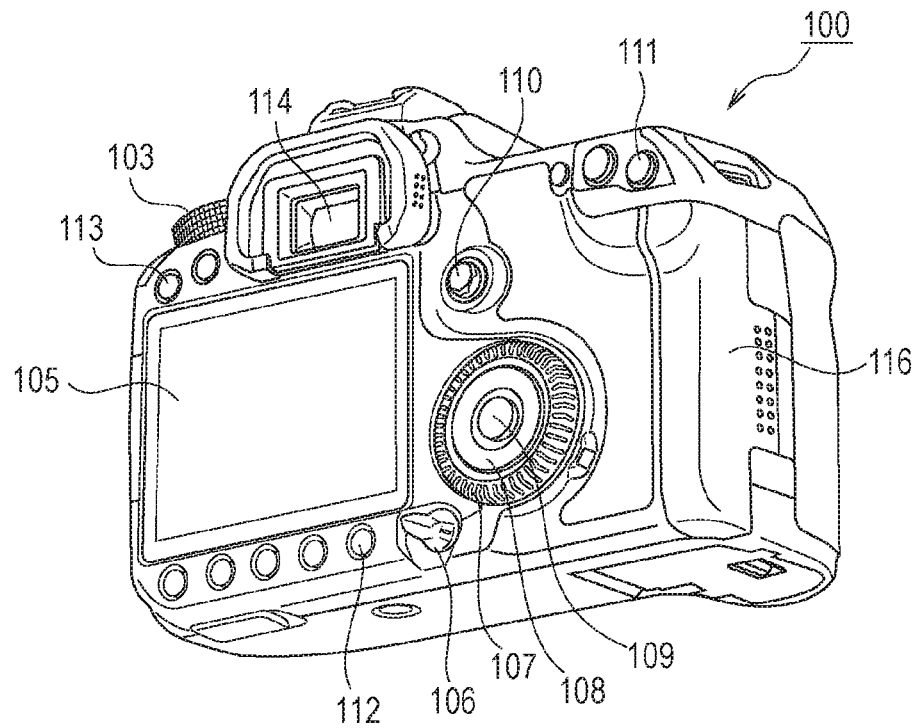

FIGS. 1A and 1B are an external appearance view of a digital camera 100 as an example of an image pickup control apparatus. FIG. 1A is a front perspective view of the digital camera 100, and FIG. 1B is a rear perspective view of the digital camera 100.

The digital camera 100 includes a shutter button 101, an electronic main dial 102, a mode switching switch 103, a flash 104, and the like which are arranged on its upper surface. The shutter button 101 is a button for instructing shooting preparation or instructing shooting. The shutter button 101 corresponds to an example of an instruction unit. The electronic main dial 102 is a rotary dial for changing a setting value such as a shutter speed, an aperture, or the like. The mode switching switch 103 is a rotary switch for switching various modes. Switching to a still image shooting mode, a moving image shooting mode, and the like is performed by the mode switching switch 103. The flash 104 is a flash apparatus built in the digital camera 100.

In addition, the digital camera 100 includes a display unit 105, a power switch 106, an electronic sub dial 107, a four-way operational key 108, a SET button 109, an LV button 110, a zoom button 111, a playback button 112, a MENU button 113, an eyepiece viewfinder 114, and the like which are arranged on its rear surface. The display unit 105 displays an image and various information. The power switch 106 is a switch for switching ON and OFF of a power supply of the digital camera 100. The electronic sub dial 107 is a rotary dial for performing movement of a selection frame, image feeding, or the like. The four-way operational key 108 is a key that can be respectively pressed in up, down, left, and right, and an operation in accordance with the pressed position can be performed. The SET button 109 is a button mainly pressed when a selection item is determined. The LV button 110 is a button for switching ON and OFF of live view display in the still image shooting mode. In addition, the LV button 110 is for instructing start and stop of moving image shooting (recording) in the moving image shooting mode. The zoom button 111 is a button for changing ON and OFF of a zoom mode in the live view display and a magnification rate in the zoom mode. In a playback mode, the zoom button 111 is used to increase the magnification rate of the playback image. The playback button 112 is a button for switching a shooting mode and the playback mode. When the playback button 112 is pressed in the shooting mode, the mode is switched to the playback mode, and the latest image among the images recorded in a recording medium is displayed on the display unit 105. The MENU button 113 is a button for switching the shooting mode and a menu mode. The eyepiece viewfinder 114 is a look-in type viewfinder for checking a focus of an optical image of a subject and a composition.

In addition, the digital camera 100 includes a grip portion 115, a lid portion 116, and the like on its right side and a terminal cover 117 and the like on its left side. The grip portion 115 is a holding portion that is formed to be easily gripped by the right hand when the photographer holds the digital camera 100. The lid portion 116 is a lid for closing a slot where the recording medium is stored. The terminal cover 117 is a cover for protecting a connector that connects a connection cable of an external device or the like.

In addition, a quick-return mirror 118 that is moved upwards and downwards by an actuator is arranged inside the digital camera 100. The digital camera 100 is also provided with a communication terminal 119 configured to communicate with a detachable lens unit.

Figure 2:
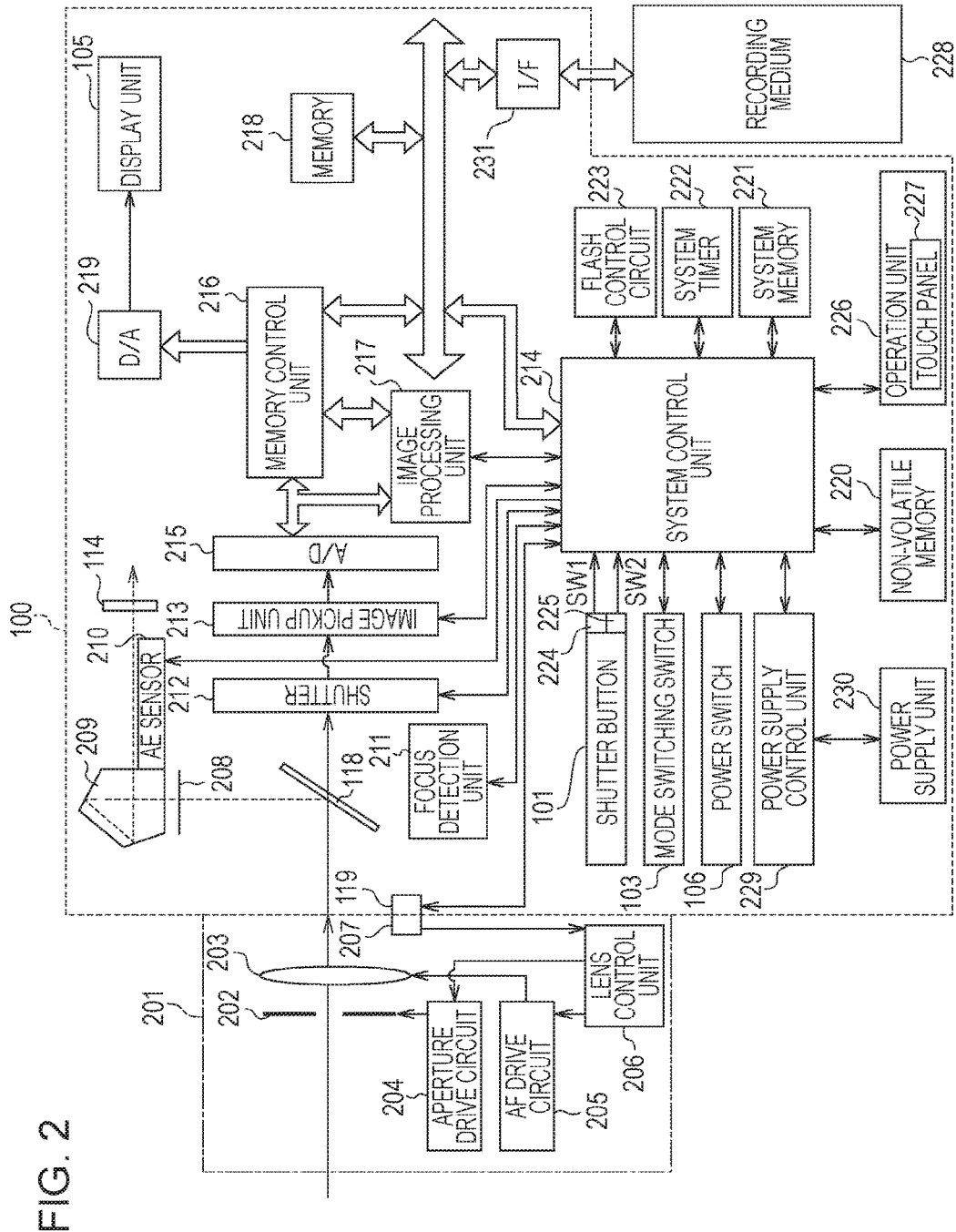
FIG. 2 is a block diagram of the digital camera.

FIG. 2 illustrates an internal configuration of the digital camera 100. It should be noted that the same configurations as those of FIGS. 1A and 1B are assigned with the same reference symbols, and descriptions thereof will be appropriately omitted. A detachable lens unit 201 is attached to the digital camera 100.

First, the lens unit 201 will be described.

The lens unit 201 includes an aperture 202, a lens group 203, an aperture drive circuit 204, an autofocus (AF) drive circuit 205, a lens control unit 206, a communication terminal 207, and the like. The aperture 202 is constituted such that an aperture diameter can be adjusted. The lens group 203 is constituted by a plurality of lenses. The aperture drive circuit 204 adjusts the light amount by controlling the aperture diameter of the aperture 202. The AF drive circuit 205 drives the lens group 203 to focus. The lens control unit 206 controls the aperture drive circuit 204, the AF drive circuit 205, and the like on the basis of instructions of a system control unit that will be described below. The lens control unit 206 can communicate with the digital camera 100. Specifically, the communication is performed via the communication terminal 207 of the lens unit 201 and the communication terminal 119 of the digital camera 100.

Next, the digital camera 100 will be described.

The digital camera 100 includes the quick-return mirror 118, a focusing screen 208, a pentagonal prism 209, an auto exposure (AE) sensor 210, a focus detection unit 211, the eyepiece viewfinder 114, a shutter 212, an image pickup unit 213, and a system control unit 214.

The quick-return mirror 118 (hereinafter, will be referred to as the mirror 118) is moved upwards and downwards by the actuator on the basis of the instructions of the system control unit 214 in a case where exposure, live view display, and moving image shooting are performed. The mirror 118 switches light flux incident from the lens group 203 to the eyepiece viewfinder 114 side or the image pickup unit 213 side. In a normal case, the mirror 118 is arranged such that the light flux is guided to the eyepiece viewfinder 114 side. On the other hand, in a case where the shooting is performed or a case where the live view display is performed, the mirror 118 is moved upwards such that the light flux is guided to the image pickup unit 213 and stands by (mirror up). The mirror 118 is constituted by half mirror in which part of light is transmitted in a central part, and part of the light flux is transmitted to be incident on the focus detection unit 211 configured to perform focus detection. The AE sensor 210 measures a luminance of the subject on the basis of the light flux guided to the eyepiece viewfinder 114 side by the mirror 118. The focus detection unit 211 detects a defocus amount on the basis of the light flux transmitted by the mirror 118. The system control unit 214 controls the lens unit 201 on the basis of the defocus amount to perform phase difference AF. The photographer observes the focusing screen 208 via the pentagonal prism 209 and the eyepiece viewfinder 114, so that it is possible to check a focus of an optical image of the subject obtained through the lens unit 201 and a composition. The shutter 212 is a focal plane shutter that can freely control an exposure time of the image pickup unit 213 on the basis of the instructions of the system control unit 214. The image pickup unit 213 is an image pickup element constituted by a charge-coupled device (CCD), a complementary metal-oxide semiconductor element, or the like that converts an optical image into an electric signal. The image pickup unit 213 corresponds to an example of an image pickup unit.

In addition, the digital camera 100 includes an analog-to-digital (A/D) converter 215, a memory control unit 216, an image processing unit 217, a memory 218, a digital-to-analog (D/A) converter 219, and the display unit 105.

The A/D converter 215 converts an analog signal output from the image pickup unit 213 into a digital signal. The image processing unit 217 performs resizing processing such as predetermined pixel interpolation or reduction or color conversion processing on data from the A/D converter 215 or data from the memory control unit 216. The image processing unit 217 also performs predetermined calculation processing by using shot image data, and the system control unit 214 performs exposure control and range-finding control on the basis of the obtained calculation result. With this processing, AF processing based on a through the lens (TTL) method, AE processing, and flash preliminary light emission (EF) processing are performed. Furthermore, the image processing unit 217 performs predetermined calculation processing by using the shot image data and also performs auto white balance (AWB) processing on the basis of the obtained calculation result.

The image data from the A/D converter 215 is directly written to the memory 218 via the image processing unit 217 and the memory control unit 216 or via the memory control unit 216. The memory 218 stores the image data obtained by the image pickup unit 213 and converted into the digital data by the A/D converter 215 and the image data to be displayed on the display unit 105. The memory 218 has a sufficient storage capacity for storing a predetermined number of still images or video and audio for a predetermined time. The memory 218 also functions as a memory (video memory) for displaying an image.

The D/A converter 219 converts the image data for the display stored in the memory 218 into the analog signal to be supplied to the display unit 105. Therefore, the image data for the display written in the memory 218 is displayed by the display unit 105 via the D/A converter 219. The display unit 105 performs display in accordance with the analog signal from the D/A converter 219 on a display device such as a liquid crystal display. The digital signal that has been subjected to A/D conversion by the A/D converter 215 once and accumulated in the memory 218 is subjected to analog conversion by the D/A converter 219 and sequentially transferred to the display unit 105 to be displayed, so that live view display can be realized, and the display unit 105 functions as an electronic viewfinder.

In addition, the digital camera 100 includes a non-volatile memory 220, a system memory 221, a system timer 222, and a flash control circuit 223.

The non-volatile memory 220 is a memory where deletion and recording can be electrically performed, and an EEPROM or the like is used as the non-volatile memory 220. The non-volatile memory 220 stores a constant for an operation of the system control unit 214, a program, or the like. This program is a program for executing various flow charts which will be described below.

It should be noted that the system control unit 214 controls the entirety of the digital camera 100. While the system control unit 214 executes the program recorded in the non-volatile memory 220, respective processings that will be described below are realized. A RAM is used as the system memory 221, for example. The constant for the operation of the system control unit 214, a variable, the program read out from the non-volatile memory 220, or the like is expanded into the system memory 221. The system control unit 214 also performs display control by controlling the memory 218, the D/A converter 219, the display unit 105, or the like.

The system timer 222 is a timer unit configured to measure a time used for various controls and a time of a built-in clock. The flash control circuit 223 performs control on popup of the flash 104, the light emission timing, the light emission amount, or the like.

In addition, the digital camera 100 includes operation units such as the mode switching switch 103, a first shutter switch 224, a second shutter switch 225, and an operation unit 226 which are configured to input various operation instructions to the system control unit 214.

The mode switching switch 103 can switch an operation mode to the still image shooting mode, the moving image shooting mode, and the playback mode. The system control unit 214 sets a mode switched by the mode switching switch 103. Modes included in the still image shooting mode include an auto shooting mode, an auto scene determination mode, a manual mode, an aperture priority mode (Av mode), and a shutter speed priority mode (Tv mode). In addition, modes included in the still image shooting mode include various scene modes corresponding to shooting settings for each shooting scene, a program AE mode, a custom mode, and the like. The mode switching can be directly switched by the mode switching switch 103 to any one of the above-described modes included in the still image shooting mode. After the switching to the still image shooting mode is performed once by the mode switching switch 103, the mode may be switched by another operation unit to any one of the above-described modes included in the still image shooting mode. Similarly, the moving image shooting mode may also include a plurality of modes.

The first shutter switch 224 is turned on in mid-course of the operation of the shutter button 101 which is so-called half press (shooting preparation instruction), to generate a first shutter switch signal SW1. The system control unit 214 starts operations such as AF processing, AE processing, AWB processing, and EF processing by the first shutter switch signal SW1. The first shutter switch 224 corresponds to an example of a first instruction unit configured to instruct shooting preparation.

The second shutter switch 225 is turned on upon the completion of the operation of the shutter button 101, which is so-called full press (shooting instruction), to generate a second shutter switch signal SW2. The system control unit 214 starts operations of a series of shooting processings from readout processing of the signal from the image pickup unit 213 until writing processing of the image data in a recording medium 228 by the second shutter switch signal SW2. The second shutter switch 225 corresponds to an example of a second instruction unit configured to instruct shooting.

The operation unit 226 corresponds to various operation members as an input unit configured to accept an operation of the photographer. The operation unit 226 functions as various function buttons while a functions is appropriately allocated to each scene when various function icons displayed on the display unit 105 is selected and operated, for example. The function buttons include, for example, an end button, a return button, an image feeding button, a jump button, a depth-of-field preview button, an attribute change button, and the like. For example, when the MENU button 113 is pressed, a menu screen with which various settings can be made is displayed on the display unit 105. The photographer can intuitively perform various settings by using the menu screen displayed on the display unit 105 and also the four-way operational key 108 and the SET button 109. The operation unit 226 also includes, for example, the shutter button 101, the electronic main dial 102, the power switch 106, the electronic sub dial 107, the four-way operational key 108, the SET button 109, the LV button 110, the zoom button 111, the playback button 112, and the like.

It should be noted that a touch panel 227 that can detect a contact on the display unit 105 is provided as one member of the operation unit 226. The touch panel 227 and the display unit 105 can be integrally constituted with each other. For example, the touch panel 227 is attached onto an upper layer of a display surface of the display unit 105 such that a transmittance of light does not disturb the display of the display unit 105. Input coordinates on the touch panel 227 are associated with display coordinates on the display unit 105, so that a graphical user interface (GUI) can be constituted as if the photographer can directly operate the screen displayed on the display unit 105. Any method may be used for the touch panel 227 among various methods including a resistive film method, an electrostatic capacitance method, a surface acoustic wave method, an infrared method, an electromagnetic induction method, an image recognition method, an optical sensor method, and the like.

The system control unit 214 can detect the following operations on the touch panel 227. A state in which a finger or a pen touches the touch panel 227 (hereinafter, will be referred to as touch-down). A state in which the finger or the pen is touching the touch panel 227 (hereinafter, will be referred to as touch-on). A state in which movement is made while the finger or the pen is touching the touch panel 227 (hereinafter, will be referred to as touch-move). A state in which the finger or the pen that has been touching the touch panel 227 is released (hereinafter, will be referred to as touch-up). A state in which nothing touches the touch panel 227 (hereinafter, will be referred to as touch-off). The system control unit 214 is notified of these operations and the positional coordinates at which the finger or the pen touches the touch panel 227 via an internal bus. The system control unit 214 determines which operation has been performed on the touch panel 227 on the basis of the notified information. With regard to the touch-move, a movement direction of the finger or the pen that moves on the touch panel 227 can also be determined for each vertical component and horizontal component on the touch panel 227 on the basis of a change in the coordinate position. When the touch-up is performed after a certain period of the touch-move from the touch-down on the touch panel 227, it is supposed that a stroke is drawn. An operation of swiftly drawing the stroke is referred to as flick. The flick is an operation in which the finger is swiftly moved by a certain distance while the finger keeps touching the touch panel 227, and then the finger is released from the touch panel 227 directly. In other words, the flick is an operation of swiftly tracing the touch panel 227 by finger as in a manner of flicking. When the touch-move by a predetermined distance or longer and at a predetermined speed or faster is detected, and the touch-up is detected directly, it is possible to determine that the flick is performed. On the other hand, in a case where the touch-move by a predetermined distance or longer and at a speed slower than a predetermined speed is detected, it is determined that drag is performed.

In addition, the digital camera 100 includes a power supply control unit 229, a power supply unit 230, a recording medium I/F 231, and the like.

The power supply control unit 229 is constituted by a battery detection circuit, a DC-DC converter, a switch circuit configured to switch a block to be distributed with power, and the like and detects whether or not a battery is mounted, a type of the battery, and a remaining amount of the battery. In addition, the power supply control unit 229 controls the DC-DC converter on the basis of the detection results and the instructions of the system control unit 214 and supplies necessary voltages to the respective units including the recording medium 228 for a necessary period. The power supply unit 230 is constituted by a primary battery such as alkaline battery or lithium battery, a secondary battery such as NiCd battery, NiMH battery, or Li battery, an AC adapter, or the like. The recording medium I/F 231 is an interface such as a memory card or a hard disc drive with the recording medium 228. The recording medium 228 is a recording medium such as a memory card for recording the shot image and is constituted by a semiconductor memory, a magnetic disc, or the like.

Next, description will be given of a coordinate system before processing of the digital camera 100 will be described.

Figure 3:
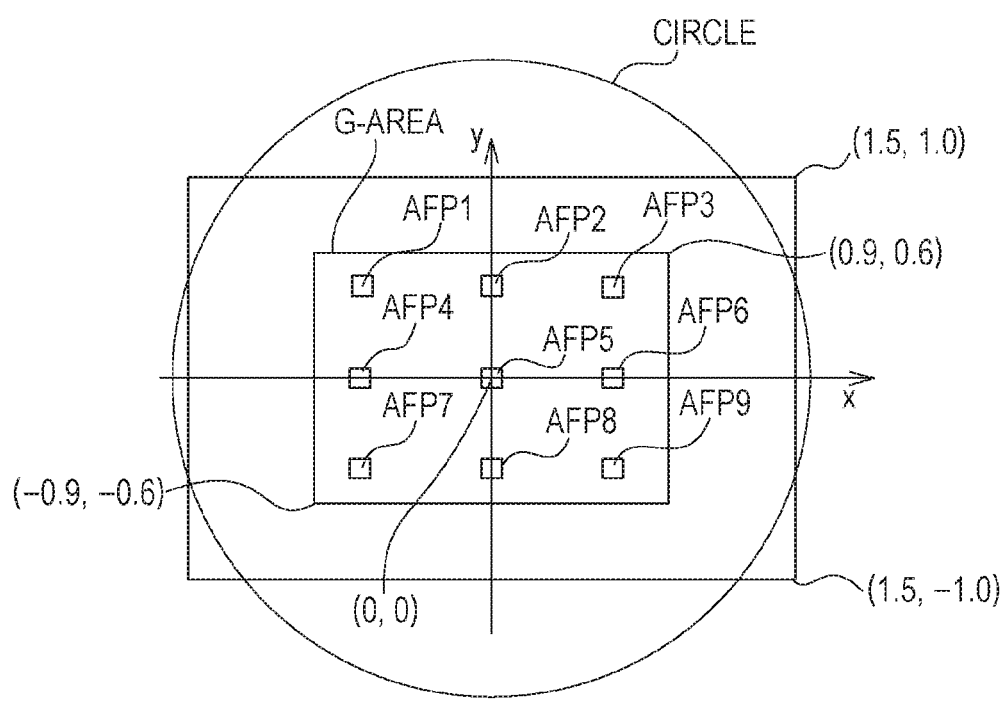
FIG. 3 is an explanatory diagram for explaining a coordinate system.

Herein, since an aspect of the focusing screen 208, the display unit 105, the image pickup unit 213, and the generated image is a field angle of 3:2 that is the same as that of a 135 film, these are all normalized by the same coordinate system to be represented. In FIG. 3, a horizontal axis x, a vertical axis y, and coordinates (x, y) are set, and the center is set as an origin (0, 0). Herein, the coordinates can be represented by the horizontal axis −1.5 to +1.5 and the vertical axis −1 to +1. For example, coordinates of the upper right corner of the range for the image pickup (on the image) can be represented as (1.5, 1.0), and coordinates of the lower right corner can be represented as (1.5, −1.0).

As illustrated in FIG. 3, when nine range-finding points indicating focusing position (focus adjustment position) are arranged as represented by AFP1 to AFP9, for example, AFP1 can be represented as (−0.6, 0.5), AFP5 can be represented as (0, 0), and AFP9 can be represented as (0.6, −0.5).

As a photographic presentation, a composition method is proposed in which a main subject is preferably arranged within a golden section frame (frame divided by the golden ratio). Herein, as illustrated in FIG. 3, the golden section frame is set as G-AREA, for example, coordinates on the upper right in the range of the G-AREA can be represented as (0.9, 0.6), and coordinates on the lower left can be represented as (−0.9, −0.6).

As illustrated in FIG. 3, CIRCLE is a circle having part protruding from the field angle (image pickup range) while the origin is set as the center. Herein, for example, CIRCLE represents a circle having a radius of 1.6.

It should be noted that variables including POS among the following variables indicates the coordinate position constituted by two elements including an x coordinate and a y coordinate.

Figure 4A:
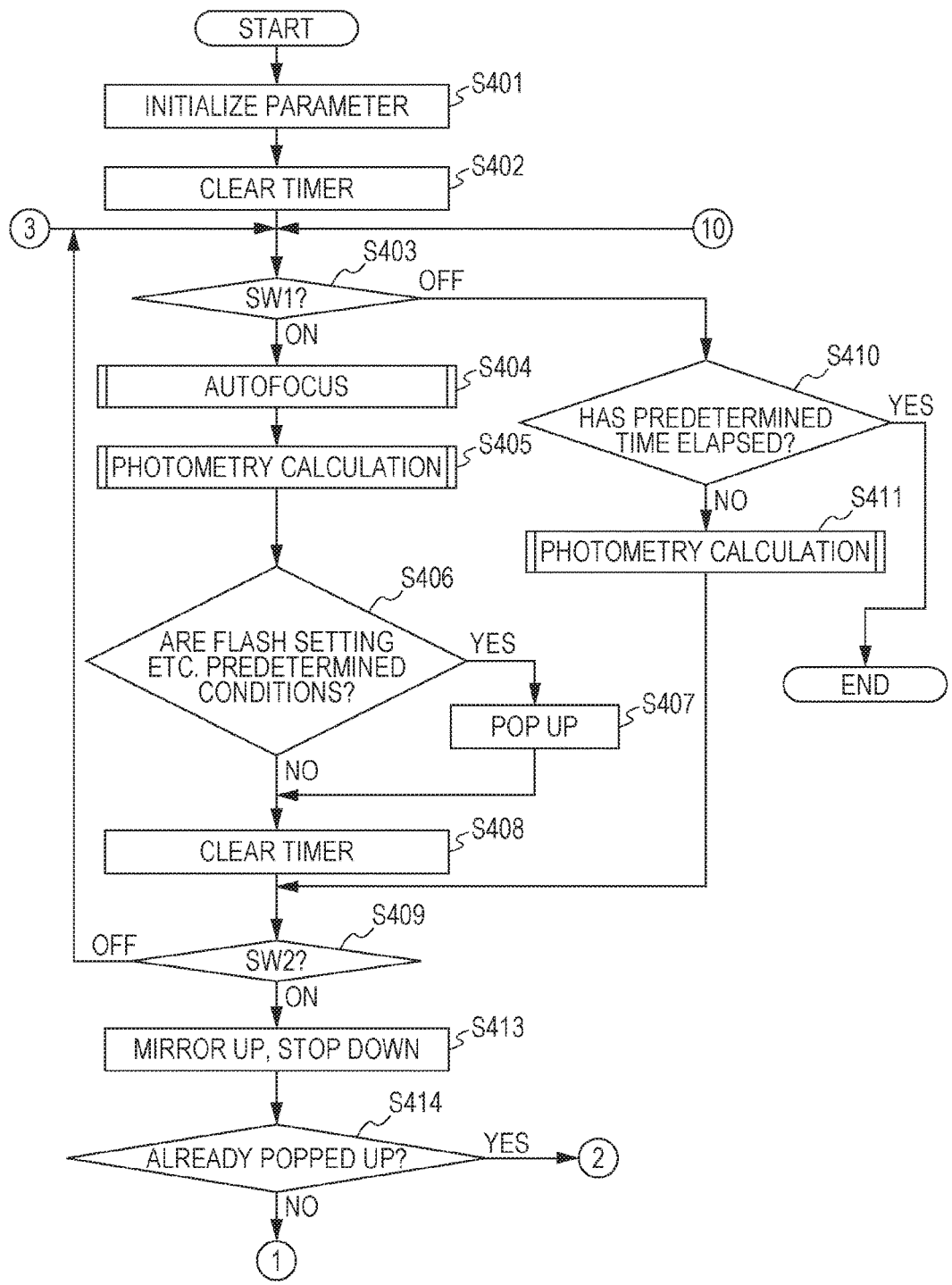
FIGS. 4A and 4B are flow charts illustrating processing of an image pickup control apparatus according to a first exemplary embodiment.
Figure 4B:
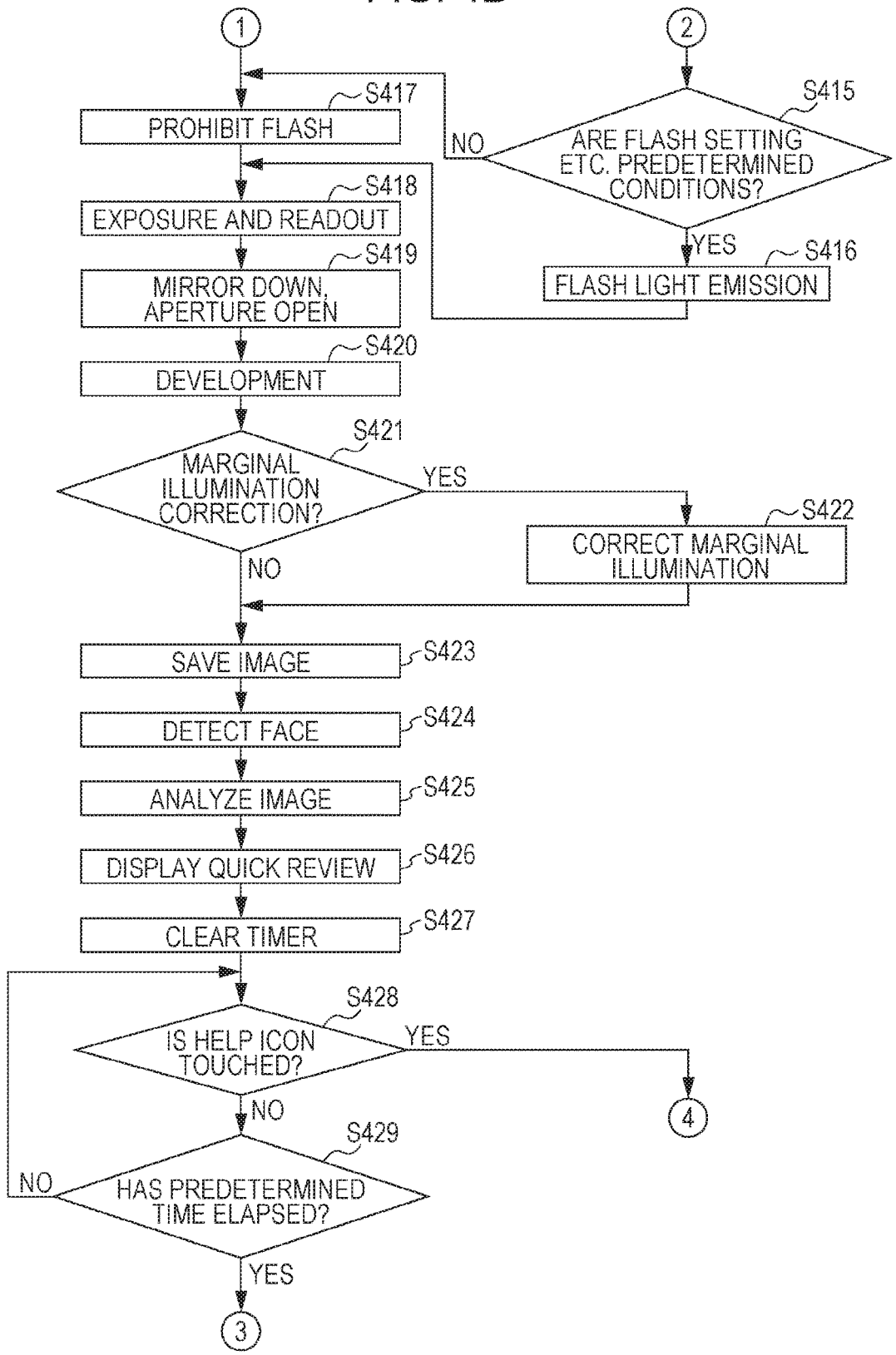

FIGS. 4A and 4B are flow charts illustrating the processing of the digital camera 100. Respective processings in the flow charts of FIGS. 4A and 4B are realized while the system control unit 214 expands the program stored in the non-volatile memory 220 into the system memory 221 and executes the program. The flow chart of FIG. 4A is started when the power supply control unit 229 is activated while the power switch 106 is turned on to supply power to the system control unit 214.

In S401, the system control unit 214 initializes various parameters related to shooting. Specifically, the system control unit 214 initializes a variable AFP, a variable PROG, a variable EXPADJ, a variable FLS, a variable PARAM, a variable WB, a variable WBADJ, and a variable VIGADJ stored in the system memory 221.

Herein, the variable AFP is a variable for storing a range-finding point number of autofocus. The initial value is 0, and Auto indicating auto select is stored. For example, in a case where 1 is stored in the variable AFP, this represents the range-finding point AFP1.

The variable PROG is a variable for storing a type of a program (program line) for calculating the shutter speed and the aperture value in the auto exposure. "Standard" is stored as the initial value.

The variable EXPADJ is a variable for storing an exposure correction amount. 0 is stored as the initial value.

The variable FLS is a variable for storing control of the built-in flash. Auto is stored at the time of auto light emission, and OFF is stored at the time of light emission prohibition. Auto is stored as the initial value.

The variable PARAM is a variable for storing a type of the development parameter. Auto is stored as the initial value.

The variable WB is a variable for storing a type of the white balance. Auto is stored as the initial value.

The variable WBADJ is a variable for storing a white balance correction amount. 0 is stored as the initial value.

The variable VIGADJ is a variable for storing the presence or absence of the marginal illumination correction. OFF is stored as the initial value.

In S402, the system control unit 214 clears the timer. Specifically, the system control unit 214 resets the system timer 222.

In S403, the system control unit 214 determines whether or not the first shutter switch signal SW1 is generated, that is, whether or not the first shutter switch 224 is operated (the shutter button 101 is half pressed). In a case where the first shutter switch signal SW1 is generated, the flow proceeds to S404. In a case where the first shutter switch signal SW1 is not generated, the flow proceeds to S410.

Figure 5A:
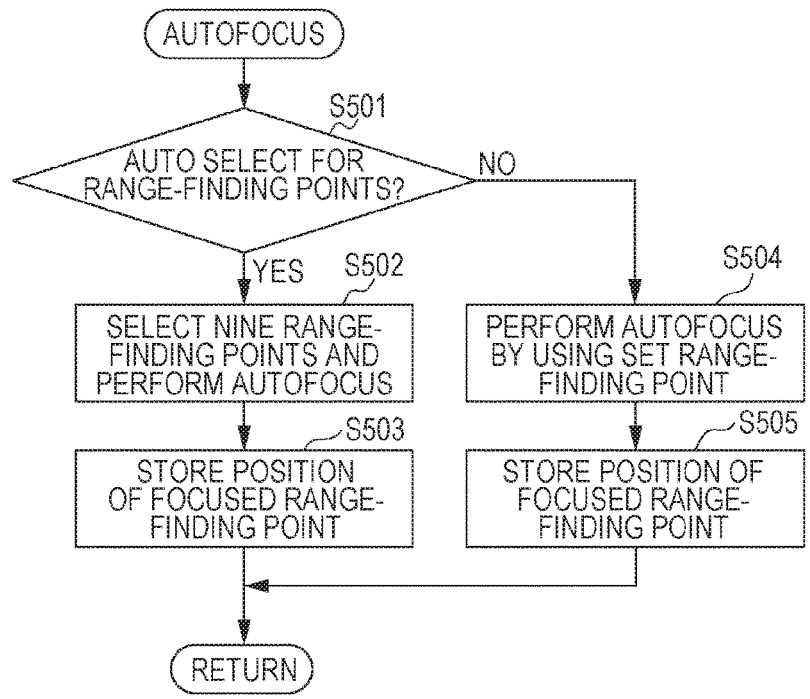
FIG. 5A is a flow chart illustrating autofocus processing.
Figure 5B:
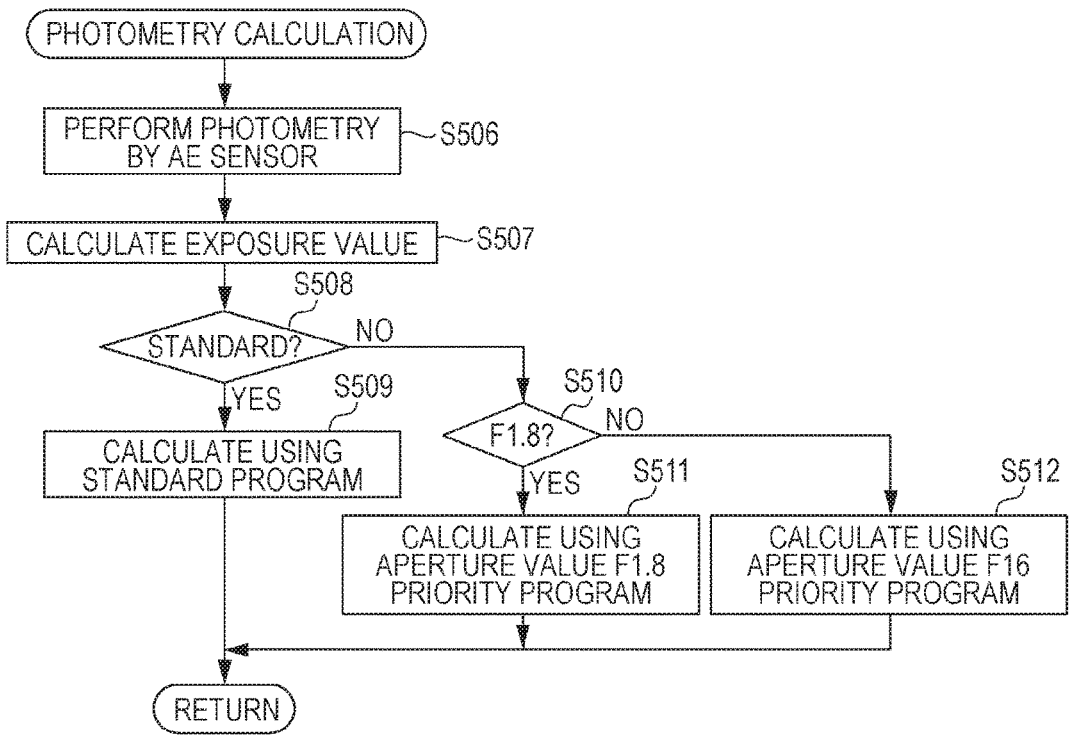
FIG. 5B is a flow chart illustrating photometry calculation processing.

In S404, the system control unit 214 executes autofocus processing. Herein, the autofocus processing will be described with reference to a flow chart of FIG. 5A. Respective processings in the respective flow charts of FIGS. 5A and 5B are realized while the system control unit 214 expands the program stored in the non-volatile memory 220 into the system memory 221 and executes the program.

In S501, the system control unit 214 determines whether or not auto select is set for the range-finding points. Specifically, the system control unit 214 determines whether or not the variable AFP is 0, that is, whether or not Auto is stored. In a case where the auto select is set, the flow proceeds to S502. In a case where the auto select is not set, the flow proceeds to S504. Herein, since Auto is stored in the variable AFP in S401, the flow proceeds to S502.

In S502, the system control unit 214 selects the range-finding points and executes the autofocus processing. Specifically, the system control unit 214 measures distances by all of the nine range-finding points via the focus detection unit 211 and selects the most reliable range-finding point to detect the defocus amount. The system control unit 214 instructs to drive the lens group 203 via the lens control unit 206 to move the lens group 203 to the in-focus position.

In S503, the system control unit 214 stores the focused range-finding point position (in-focus position). Specifically, the system control unit 214 stores the coordinates of the focused range-finding point in a variable JFPOS stored in the system memory 221.

On the other hand, in a case where the flow proceeds from S501 to S504, the system control unit 214 executes the autofocus processing by the set range-finding point. Specifically, the system control unit 214 reads out the range-finding point stored in the variable AFP and measures the distance by the read range-finding point. The system control unit 214 instructs to drive the lens group 203 via the lens control unit 206 to move the lens group 203 to the in-focus position.

In S505, the system control unit 214 stores the coordinates of the focused range-finding point in the variable JFPOS that is stored in the system memory 221.

Thereafter, with reference to the flow chart of FIG. 4A again, the flow proceeds to S405.

In S405, the system control unit 214 executes the photometry calculation. Herein, the photometry calculation will be described with reference to a flow chart of FIG. 5B.

In S506, the system control unit 214 measures the luminance of the subject. Specifically, the system control unit 214 measures the luminance of the subject via the AE sensor 210 and stores the photometry result in a variable By that is stored in the system memory 221.

In S507, the system control unit 214 calculates the exposure value. Specifically, the system control unit 214 calculates an exposure value Ev by using an expression of Ev=Bv+Sv−EXPADJ. Sv is a so-called ISO speed rating. Herein, an exposure value of an appropriate exposure is obtained by Bv+Sv, and the luminance is corrected by subtracting the variable EXPADJ corresponding to the exposure correction amount from the exposure value. It should be noted that 0 is stored in the variable EXPADJ in S401.

In S508, the system control unit 214 determines whether or not "standard" is stored in the variable PROG. In a case where "standard" is stored, the flow proceeds to S509. In a case where "standard" is not stored, the flow proceeds to S510.

Figure 6:
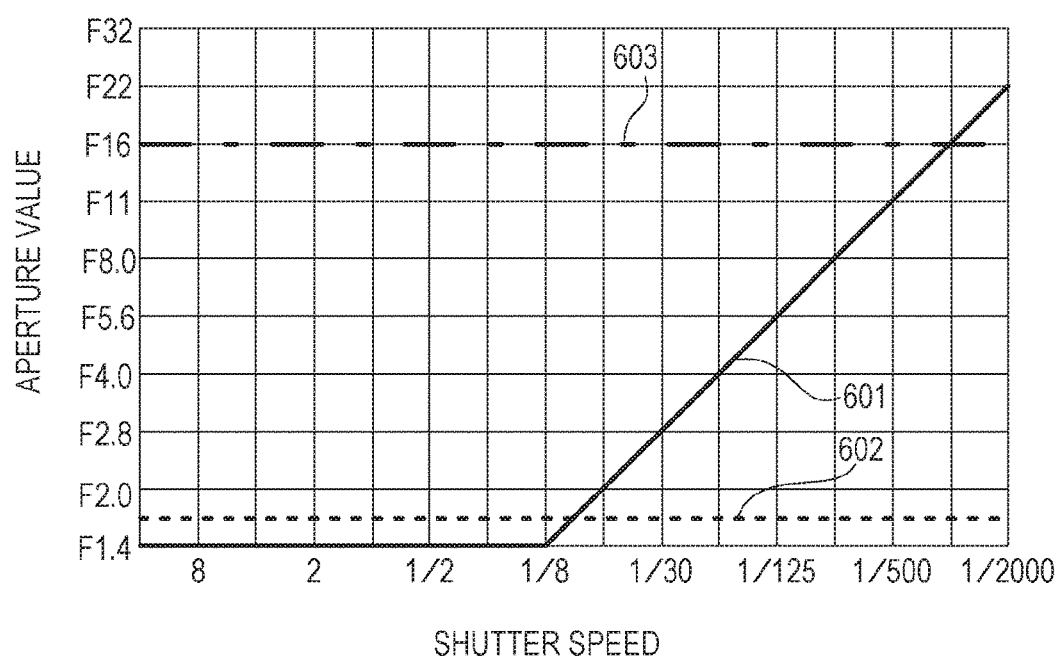
FIG. 6 illustrates program lines of a shutter speed and an aperture value.

In S509, the system control unit 214 calculates a shutter speed and an aperture value on the basis of a standard program. FIG. 6 illustrates a standard program line 601, an aperture value F1.8 priority program line 602, and an aperture value F16 priority program line 603 for calculating the shutter speed and the aperture value. The standard program line 601 rises at 45 degrees from the shutter speed ⅛ and the aperture value F1.4. The system control unit 214 calculates the shutter speed Tv and an aperture value Av from the exposure value Ev calculated in S507 in accordance with the standard program line 601.

In S510, the system control unit 214 determines whether or not F1.8 is stored in the variable PROG. In a case where F1.8 is stored, the flow proceeds to S511. In a case where F1.8 is not stored, the flow proceeds to S512.

In S511, the system control unit 214 calculates the shutter speed and the aperture value from the exposure value Ev calculated in S507 in accordance with the aperture value F1.8 priority program line 602 of FIG. 6.

In S512, the system control unit 214 calculates the shutter speed and the aperture value from the exposure value Ev calculated in S507 in accordance with the aperture value F16 priority program line 603 of FIG. 6.

In this manner, the system control unit 214 measures the luminance of the subject and calculates the shutter speed and the aperture value.

Thereafter, with reference to the flow chart of FIG. 4A again, the flow proceeds to S406.

In S406, the system control unit 214 determines whether or not the flash setting and the exposure value are predetermined conditions. Specifically, the system control unit 214 determines whether or not Auto is stored in the variable FLS, and also the exposure value Ev is lower than a predetermined value. Herein, the predetermined value is, for example, Ev3. It is assumed that a case where the exposure value Ev is lower than the predetermined value is a case where the subject is dark. In a case where this condition is satisfied, the flow proceeds to S407. In a case where this condition is not satisfied, the flow proceeds to S408. It should be noted that the predetermined condition is not limited to this case. When so-called fill-in flash is set in which flash light emission is performed in a case where Auto is stored in the variable FLS, and also backlight occurs or in order to avoid a situation that the subject becomes a shadow because of the backlight, the flow may proceed to S407.

In S407, the system control unit 214 causes the flash 104 to pop up via the flash control circuit 223.

In S408, the system control unit 214 clears the timer. Specifically, the system control unit 214 resets the system timer 222.

In S409, the system control unit 214 determines whether or not the second shutter switch signal SW2 is generated, that is, whether or not the second shutter switch 225 is operated (the shutter button 101 is fully pressed). In a case where the second shutter switch signal SW2 is not generated, the flow returns to S403.

Therefore, while the shutter button 101 is half pressed, the system control unit 214 repeatedly performs the autofocus processing and the photometry calculation. On the other hand, in S403, when the finger is released from the shutter button 101 to cancel the half press, the system control unit 214 determines that the first shutter switch signal SW1 is not generated, and the flow proceeds to S410.

In S410, the system control unit 214 determines whether or not a predetermined time has elapsed since the system timer 222 clears the timer. Herein, the predetermined time is, for example, 6 seconds. In a case where the predetermined time has not elapsed, the flow proceeds to S411. In a case where the predetermined time has elapsed, the processing of the flow chart is ended.

In S411, the system control unit 214 executes the photometry calculation. This processing is processing similar to S405, and descriptions thereof will be omitted.

In this manner, while the finger is released from the shutter button 101, S410, S411, and S409 are repeatedly executed, and only the photometry calculation is performed. Thereafter, when the predetermined time elapses according to the system timer 222, the system control unit 214 ends the processing of the flow chart.

On the other hand, in S409, in a case where the second shutter switch signal SW2 is generated, that is, a case where the second shutter switch 225 is operated (the shutter button 101 is fully pressed), the flow proceeds to S413.

In S413, the system control unit 214 flips up the mirror 118 via an actuator and also sets the aperture 202 at the aperture value Av calculated in S405 via the lens control unit 206 and the aperture drive circuit 204.

In S414, the system control unit 214 determines whether or not the flash 104 is popped up. In a case where the flash 104 is popped up, the flow proceeds to S415. In a case where the flash 104 is not popped up, the flow proceeds to S417.

In S415, the system control unit 214 determines whether or not the flash setting and the exposure value are predetermined conditions. Specifically, the system control unit 214 determines whether or not Auto is stored in the variable FLS, and also the exposure value Ev is lower than the predetermined value. This processing is the same processing as S406. In a case where this condition is satisfied, the flow proceeds to S416. In a case where this condition is not satisfied, the flow proceeds to S417.

In S416, the system control unit 214 causes the flash control circuit 223 to prepare for the light emission. Specifically, the system control unit 214 stores YES in a light emission determination flag FLSEMIT for determining if the light has been already emitted. Herein, only when it is determined that the flash 104 is popped up and also that the lastly measured exposure value Ev is lower than the predetermined value and the subject is dark, the flow proceeds to S416. That is, even when it is determined that the subject is dark at the time of the popup, the condition of the subject may be changed, and the subject may become bright in some cases. In this case, since the flash 104 does not need to be caused to emit light, it is determined again whether or not the condition is satisfied.

In S417, the system control unit 214 sets the flash control circuit 223 such that the flash 104 is not caused to emit light. Specifically, the system control unit 214 stores NO in the light emission determination flag FLSEMIT.

In S418, the system control unit 214 starts the exposure to the image pickup unit 213 and the readout from the image pickup unit 213. Specifically, after the system control unit 214 instructs the image pickup unit 213 to accumulate charges, a leading curtain of the shutter 212 is caused to travel. In S416, in a case where the flash control circuit 223 is caused to prepare for the light emission, when the travelling of the leading curtain is ended, the system control unit 214 starts the flash light emission via the flash control circuit 223. When the exposure is performed for a time at the shutter speed calculated in S405, the system control unit 214 causes a trailing curtain of the shutter 212 to travel and shade the image pickup unit 213 to end the exposure. When the exposure is ended, the system control unit 214 drives the A/D converter 215 to read out an image signal accumulated in the image pickup unit 213. The image signal is converted into the digital signal to be stored in the memory control unit 216 as a RAW image.

In S419, the system control unit 214 flips down the mirror 118 and also opens the aperture 202. Specifically, when the system control unit 214 instructs the lens control unit 206 to open the aperture 202, the aperture drive circuit 204 drives the aperture 202 into an open state.

In S420, the system control unit 214 performs development. Specifically, the system control unit 214 reads out the RAW image stored in the memory control unit 216 and performs image processing such as color interpolation processing, white balance processing, and color correction processing via the image processing unit 217. At this time, the image processing unit 217 performs image processing by using the variable PARAM for selecting the type of the development parameter, the variable WB for selecting the type of the white balance, and the variable WBADJ for selecting the white balance correction amount. It should be noted that, since Auto is stored in the variable PARAM and the variable WB and 0 is stored in the variable WBADJ in S401, the image processing unit 217 performs the image processing by way of the standard color correction processing and the auto white balance without the white balance correction.

In S421, the system control unit 214 determines whether or not a marginal illumination is corrected. Specifically, the system control unit 214 determines whether or not ON is stored in the variable VIGADJ. In a case where ON is stored in the variable VIGADJ, the flow proceeds to S422. In a case where OFF is stored in the variable VIGADJ, the flow proceeds to S423. It should be noted that, since OFF is stored in the variable VIGADJ in S401, the flow proceeds to S423.

In S422, the system control unit 214 corrects the marginal illumination via the image processing unit 217. Specifically, the system control unit 214 increases a marginal luminance of the image data on the basis of a previously calculated marginal illumination decreased amount of the lens group 203 to correct a decrease in the marginal illumination.

In S423, the system control unit 214 saves the image data on which the image processing has been performed. Specifically, the system control unit 214 stores compressed image data obtained by compressing the image data on the basis of the JPEG format in the recording medium 228.

In S424, the system control unit 214 performs face detection from the image data via the image processing unit 217. Specifically, the system control unit 214 transmits the target image data to the image processing unit 217. The image processing unit 217 applies a horizontal direction band pass filter and a vertical direction band pass filter to the image data to detect edge components from the image data. The system control unit 214 performs pattern matching with regard to the detected edge components and extracts candidate groups of eyes, nose, mouth, and ears. The system control unit 214 determines candidates satisfying a previously set condition (for example, a distance between the two eyes, an inclination, or the like) among the extracted candidate groups of the eyes as the pair of eyes and narrows down only the candidates having the pair of eyes as the candidate group of the eyes. The system control unit 214 associates the narrowed-down candidate group of the eyes with other parts (nose, mouth, and ears) forming the corresponding face and also adopts a previously set non-face condition filter to detect the face. The system control unit 214 outputs face information in accordance with the detection result of the face and ends the processing. At this time, the system control unit 214 stores a feature amount such as the number of faces in the system memory 221 and also stores a position of the face image in a variable FPOS.

While the image analysis of the image data is performed as described above, it is possible to extract the feature amount of the image data and detect the subject information. Herein, the face information has been described as the subject information, for example, but the subject information also includes information of red-eye determination, eye detection, eye closure detection, smiling face detection, and the like.

In S425, the system control unit 214 performs the image analysis. Specifically, the system control unit 214 analyzes the image data on which the image processing has been performed to determine in which scene the shooting has been performed and stores the determined scene in a variable SCN. For example, in a case where the system control unit 214 determines that the scene is a sunset scene, the system control unit 214 stores scene information indicating the sunset scene in the variable SCN.

Figure 7A:
FIGS. 7A to 7F illustrate a display example displayed on a display unit.

In S426, the system control unit 214 performs quick review display. Specifically, as illustrated in FIG. 7A, the system control unit 214 displays the saved image data and a help icon 701. Herein, the help icon 701 is an icon selected by the photographer in a case where a help regarding a use method of the digital camera 100 or the like is demanded.

In S427, the system control unit 214 clears the timer. Specifically, the system control unit 214 resets the system timer 222.

In S428, the system control unit 214 determines whether or not the help icon 701 is selected, that is, whether or not the help icon 701 is touched. In a case where the help icon 701 is not touched, the flow proceeds to S429.

In S429, the system control unit 214 determines whether or not a predetermined time has elapsed since the system timer 222 clears the timer. Herein, the predetermined time is, for example, 6 seconds. In a case where the predetermined time has not elapsed, the flow returns to S428. In a case where the predetermined time has elapsed, the flow proceeds to S403. Therefore, when the help icon 701 is not touched, the quick review display is performed for the predetermined time, and thereafter the flow returns to S403.

In this manner, the image data which is obtained while the shooting is performed by way of the auto select autofocus, the shutter speed and the aperture value based on the standard program, and the auto flash light emission and on which the image processing has been performed on the basis of the standard color correction processing without the auto white balance correction is saved in the recording medium 228. Herein, when the image is observed through the quick review display, the photographer may feel dissatisfaction in some cases because the image is different from the desired finish. As specific dissatisfactions, the following aspects are exemplified. That is, the image is dark, the automatically selected in-focus position does not correspond to the desired subject, the flash light emission should not have been performed, the white balance does not turn out the desired color, the background is not clear, and the like.

At this time, an advanced user can operate the setting of the digital camera 100 to perform an exposure correction, switch to single point autofocus, change a type of the white balance, or switch to an aperture priority mode, so that it is possible to make an approach to the desired finish.

On the other hand, the beginner does not understand terms such as the exposure correction and the white balance in some cases and does not figure out how to perform the setting. Thus, even when the beginner feels the dissatisfaction with the finish, the beginner may end the shooting because no dealing method is found in some cases.

Figure 8B:
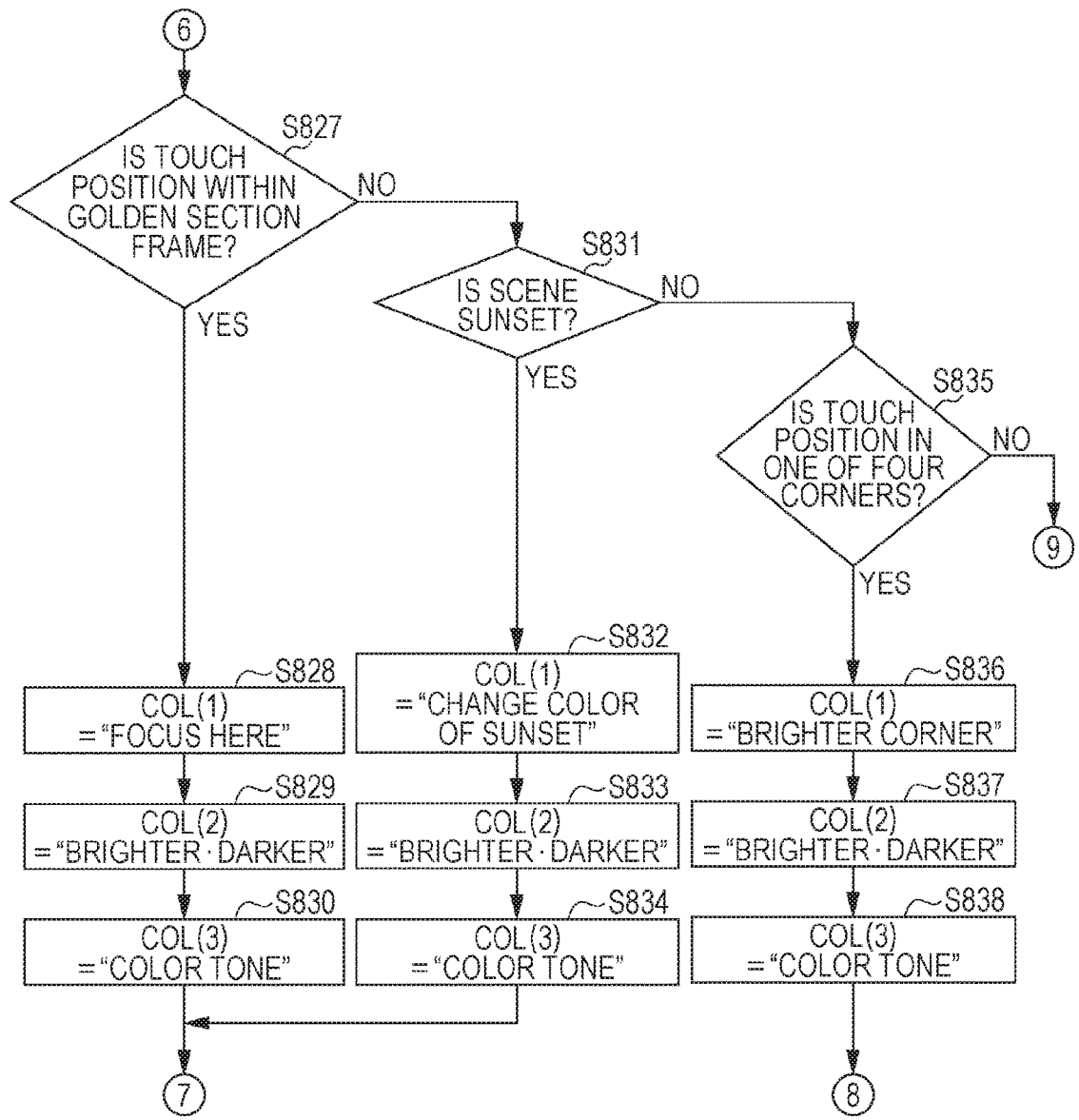
Figure 8C:
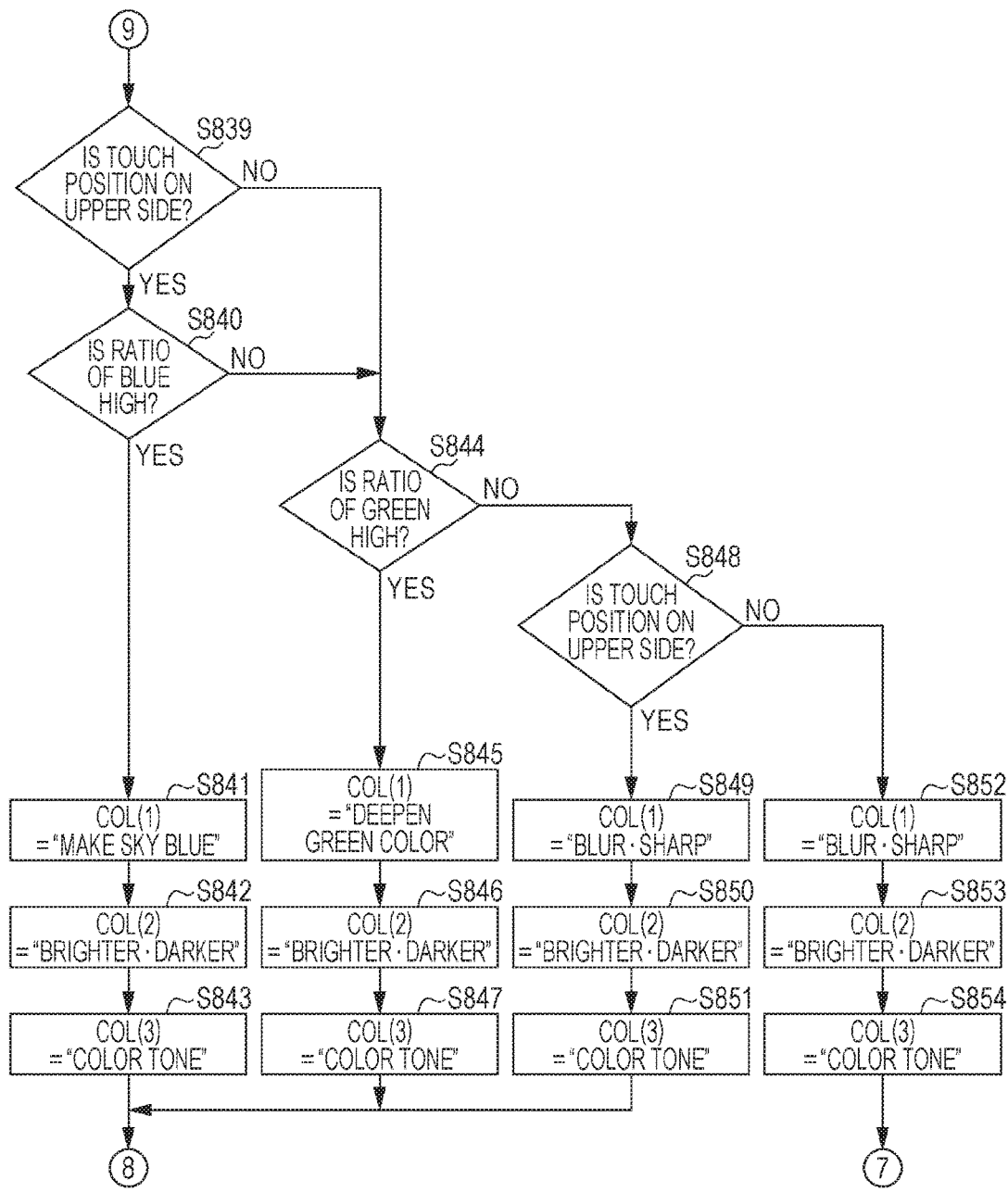

According to the present exemplary embodiment, while the unsatisfied position in the image after the shooting is touched, it is possible to easily make an approach to the desired finish. Hereinafter, a detail thereof will be described. Herein, when the help icon 701 is touched in S428 of FIG. 4B, the flow proceeds to S801 in the flow chart of FIG. 8A. Respective processings in the flow charts of FIGS. 8A to 8C are realized while the system control unit 214 expands the program stored in the non-volatile memory 220 into the system memory 221 and executes the program.

In S801, the system control unit 214 displays the saved image data on the display unit 105. This processing is an example of processing by a first display processing unit.

In S802, the system control unit 214 determines whether or not the display unit 105 is touched, specifically, whether or not the image displayed on the display unit 105 is touched. Herein, the photographer touches the unsatisfied position in the displayed image. In a case where the image displayed on the display unit 105 is touched, the flow proceeds to S803. In a case where the image displayed on the display unit 105 is not touched, the flow stands by until the image is touched. At this time, the image displayed on the display unit 105 is not an image on the live view display but is the already saved image data. For example, in a case where the image on the live view display is touched as in the related art, while the photographer holds the digital camera 100 at a predetermined angle by one hand, the photographer needs to touch the live view image by the other hand. In contrast, in the case of the saved image data, the image does not change like the live view image, and therefore the photographer can hold the digital camera 100 in a state in which it is easy to touch the image.

In S803, the system control unit 214 obtains the coordinates of the touch position via the touch panel 227. The system control unit 214 stores the obtained coordinates of the touch position in a variable TPOS. This processing corresponds to an example of processing by an obtaining unit configured to obtain position information input by the photographer.

In S804, the system control unit 214 determines whether or not the touch position is in the neighborhood of the detected face position. Specifically, the system control unit 214 calculates a distance between the variable TPOS and the variable FPOS. In a case where the calculated distance is within a predetermined threshold (first threshold), the system control unit 214 can determine that the touch position is in the neighborhood of the face position. It should be noted that a value in accordance with a size of the detected face can be used as the threshold. In a case where the touch position is in the neighborhood of the face position, the flow proceeds to S805. In a case where the touch position is not in the neighborhood of the face position, the flow proceeds to S823.

In S805, the system control unit 214 determines whether or not the touch position is in the neighborhood of the focused range-finding point. Specifically, the system control unit 214 calculates a distance between the variable TPOS and the variable JFPOS. In a case where the calculated distance is within a predetermined threshold (second threshold), the system control unit 214 can determine that the touch position is in the neighborhood of the range-finding point. In a case where the touch position is in the neighborhood of the range-finding point, the flow proceeds to S806. In a case where the touch position is not in the neighborhood of the range-finding point, the flow proceeds to S820.

Figure 7B:
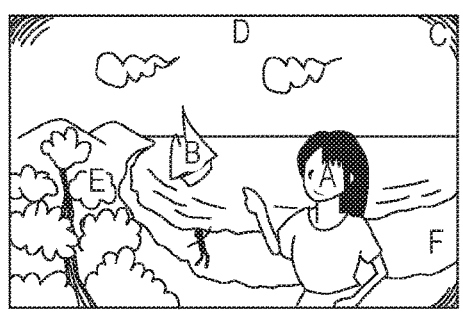

Herein, in S804 and S805, it is determined whether or not a face portion A of a woman illustrated in FIG. 7B is touched. When it is the face, the subject is likely to be a main subject. In addition, in a case where the face is in focus, it is possible to determine that the photographer feels dissatisfaction with a photographic parameter of the main subject. It should be noted that A to F in FIG. 7B are illustrated for the sake of descriptions and are not displayed in actuality.

In S806, the system control unit 214 stores in "brighter • darker" the variable COL(1) for selecting the character array.

In S807, the system control unit 214 stores "color tone" in the variable COL(2) for selecting the character array.

In S808, the system control unit 214 stores "beautify skin" in the variable COL(3) for selecting the character array.

The processings in S806 to S808 correspond to an example of processing by an estimation unit configured to estimate a demand of the photographer on the basis of the touch position.

In S809, the system control unit 214 determines whether or not the image is obtained under flash light emission. Specifically, the system control unit 214 determines whether or not the light emission determination flag FLSEMIT is YES. When the flash light emission has been performed, the flow proceeds to S810. When the flash light emission has not been performed, the flow proceeds to S811.

In S810, the system control unit 214 stores "prohibit flash" in the variable COL(3) for selecting the character array. That is, the system control unit 214 updates the already stored character string of the variable COL(3) to "prohibit flash".

The processings in S809 and S810 correspond to an example of the processing by the estimation unit configured to estimate the demand of the photographer on the basis of the presence or absence of the flash light emission corresponding to one of the shooting conditions in addition to the position information.

Figure 7C:
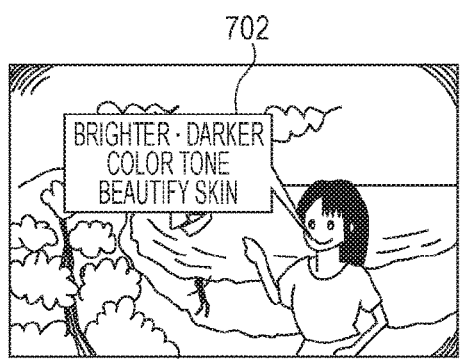

In S811, the system control unit 214 displays the character strings stored in the variables COL(1) to COL(3) on the display unit 105. Specifically, as illustrated in FIG. 7C, the system control unit 214 displays the dialogue balloon 702 from the touch position while being overlapped with the image and displays the character strings of the variables COL(1) to COL(3) in the dialogue balloon 702. This processing corresponds to an example of processing by a second display processing unit. For example, in a case where the focused face is touched in the image obtained without the flash light emission, "brighter • darker/color tone/beautify skin" is displayed. In a case where the focused face is touched in the image obtained under the flash light emission, "brighter • darker/color tone/prohibit flash" is displayed. At this time, the dialogue balloon 702 is displayed at a position different from the touch position, so that the photographer can check the image at the touch position. It should be noted that the system control unit 214 recognizes which positions in the display unit 105 the character strings of the variables COL(1) to COL(3) are respectively displayed.

In S812, the system control unit 214 determines whether or not the display unit 105 is touched. In a case where the display unit 105 is touched, the flow proceeds to S813. In a case where the display unit 105 is not touched, the flow stands by until the display unit 105 is touched.

In S813, the system control unit 214 obtains the coordinates of the touch position via the touch panel 227.

In S814, the system control unit 214 determines whether or not an area where the character string of the variable COL(1) is displayed is touched. In a case where the area is touched, the flow proceeds to S815. In a case where the area is not touched, the flow proceeds to S816.

In S815, the system control unit 214 stores the character string of the variable COL(1) in a variable DEM. For example, in the case of FIG. 7C, the system control unit 214 stores the character string "brighter • darker" in the variable DEM. Thereafter, the flow proceeds to the flow charts of FIGS. 10A to 10C.

In S816, the system control unit 214 determines whether or not an area where the character string of the variable COL(2) is displayed is touched. In a case where the area is touched, the flow proceeds to S817. In a case where the area is not touched, the flow proceeds to S818.

In S817, the system control unit 214 stores the character string of the variable COL(2) in the variable DEM. For example, in the case of FIG. 7C, the system control unit 214 stores the character string "color tone" in the variable DEM. Thereafter, the flow proceeds to the flow chart of FIG. 10A.

In S818, the system control unit 214 determines whether or not an area where the character string of the variable COL(3) is displayed is touched. In a case where the area is touched, the flow proceeds to S819. In a case where the area is not touched, since an element other than a dialogue balloon 702 is touched, the flow returns to S812, and the flow stands by again until the touch is detected.

In S819, the system control unit 214 stores the character string of COL(3) in the variable DEM. For example, in the case of FIG. 7C, the system control unit 214 stores the character string "beautify skin" in the variable DEM. It should be noted that, in a case where "prohibit shutter" is stored in the variable COL(3), the system control unit 214 stores the character string "prohibit shutter" in the variable DEM. Thereafter, the flow proceeds to the flow chart of FIG. 10A.

In this manner, in a case where the focused face without the flash light emission is touched, three demands (options) "brighter•darker", "color tone", and "beautify skin" related to the photographic parameters of the main subject are displayed. On the other hand, in the case where the flash light emission is performed, the light emission may be performed against the intention of the photographer in some cases, a change is made to display the option "prohibit flash" which is a superior demand to "beautify skin". As described above, while the demands are sorted out to be displayed in response to whether or not the flash light emission is performed, the photographer can select an optimal demand.

In S805, in a case where the touch position is not in the neighborhood of the focused range-finding point, the flow proceeds to S820. Herein, this case is a case where the touch position is in the neighborhood of the face position but the face is not in focus, and therefore it is possible to determine that the photographer feels dissatisfaction with the focus. For this reason, after the flow passes through S820 to S822, in S811, the system control unit 214 displays the character string "focus here/brighter•darker/beautify skin". It should be noted that "prohibit flash" is prioritized and displayed in a case where the flash light emission is performed similarly as in S809 and S810.

In S804, in a case where the touch position is not in the neighborhood of the face, the flow proceeds to S823.

In S823, the system control unit 214 determines whether or not the touch position is in the neighborhood of the range-finding point. This processing can be processed similarly as in S805. In a case where the touch position is in the neighborhood of the range-finding point, it is possible to determine that the touch position is a main subject other than the face. For example, a case is assumed where a yacht B illustrated in FIG. 7B is in focus, and the yacht B is touched. In this case, it is possible to determine that the photographer feels dissatisfaction with the photographic parameters of the main subject. For this reason, after the flow passes through S824 to S826, in S811, the system control unit 214 displays the character string "brighter • darker/color tone/blur • sharp". It should be noted that, since the face is not detected, the demand "beautify skin" does not exist. Thus, the character string "blur • sharp", which is highly demanded after "beautify skin", is stored in the variable COL(3). In addition, "prohibit flash" is prioritized and displayed in a case where the flash light emission is performed.

In S823, in a case where the touch position is not in the neighborhood of the focused range-finding point, the flow proceeds to S827.

In S827, the system control unit 214 determines whether or not the touch position is within the golden section frame. Herein, the golden section frame is the G-AREA illustrated in FIG. 3. In a case where the touch position is within the golden section frame, the flow proceeds to S828. In a case where the touch position is not within the golden section frame, the flow proceeds to S831. For example, a case is assumed where an element other than the yacht B illustrated in FIG. 7B is in focus, and the yacht B is touched. Since a probability that the main subject is positioned within the golden section frame is high, in a case where an area within the golden section frame is touched, it is possible to determine that the photographer feels dissatisfaction with the focus of the main subject. For this reason, after the flow passes through S828 to S830, in S811, the system control unit 214 displays the character string "focus here/brighter • darker/color tone". It should be noted that, since the face is not detected, the demand "beautify skin" does not exist. Therefore, the character string "color tone", which is highly demanded after "beautify skin", is stored in the variable COL(3). In addition, "prohibit flash" is prioritized and displayed in a case where the flash light emission is performed.

In S827, in a case where the touch position is out of the golden section frame, the flow proceeds to S831.

In S831, the system control unit 214 determines whether or not the scene is a predetermined scene. Specifically, the system control unit 214 determines whether or not the scene is a sunset scene on the basis of scene information as the image information stored in the variable SCN. In a case where the scene is the predetermined scene, the flow proceeds to S832. In a case where the scene is a scene other than the predetermined scene, the flow proceeds to S835. Herein, in a case where an area out of the golden section frame is touched, a probability that background is touched is high. At this time, for example, in the sunset scene, it is possible to determine that the demand is to emphasize the color of the red setting sun. For this reason, after the flow passes through S832 to S834, in S811, the system control unit 214 displays the character string "change color of sunset/brighter • darker/color tone". In addition, "prohibit flash" is prioritized and displayed in a case where the flash light emission is performed.

In S831, in a case where the scene is not the sunset scene, the flow proceeds to S835.

In S835, the system control unit 214 determines whether or not the touch position is within a predetermined range from any one of the four corners of the screen (four peaks). Specifically, when the system control unit 214 determines whether or not the touch position is outside of the CIRCLE illustrated in FIG. 3, it is possible to determine whether or not the touch position is within the predetermined range from any one of the four corners. That is, the coordinates of the variable TPOS indicating the touch position are set as (Xtp, Ytp), a distance from the origin (0, 0) is calculated as $\sqrt{(Xtp^2+Ytp^2)}$. In a case where this distance is larger than the radius of the CIRCLE, it is possible to determine that the touch position is outside the predetermined range. For example, a case is assumed where a corner part C illustrated in FIG. 7B is touched. In this case, it is possible to determine that the photographer feels dissatisfaction with the decrease in the marginal illumination of the lens or the like. For this reason, after the flow passes through S836 to S838, in S811, the system control unit 214 displays the character string "brighter corner/brighter • darker/color tone". It should be noted that, since the presence or absence of the flash light emission hardly affects the screen corners, the processing in S809 is omitted.

In S835, in a case where the touch position is not within the predetermined range from any one of the four corners the touch position, the flow proceeds to S839.

In S839, the system control unit 214 determines whether or not the touch position is on an upper side with respect to a predetermined position. Specifically, when the coordinates of the variable TPOS are set as (Xtp, Ytp), for example, it is determined whether or not Ytp is higher than 0.6. In a case where the touch position is on the upper side, the flow proceeds to S840. In a case where the touch position is not on the upper side, the flow proceeds to S844.

In S840, the system control unit 214 extracts pixels around the touch position and determines whether or not a ratio of blue is high on the basis of ratio information of red, green, and blue as the image information. In a case where the ratio of blue is high, the flow proceeds to S841. In a case where the ratio of blue is not high, the flow proceeds to S844. For example, a case is assumed where a sky part D illustrated in FIG. 7B is touched. In this case, it is possible to determine that the photographer demands to change a blue color in the sky. For this reason, after the flow passes through S841 to S843, in S811, the system control unit 214 displays the character string "make sky blue/brighter • darker/color tone". It should be noted that, since the flash light emission does not reach the sky, the processing in S809 is omitted.

In S840, in a case where the ratio of blue is not high, the flow proceeds to S844.

In S844, the system control unit 214 extracts the pixels around the touch position and determines whether or not a ratio of green is high on the basis of the ratio information of red, green, and blue as the image information. In a case where the ratio of green is high, the flow proceeds to S845. In a case where the ratio of green is not high, the flow proceeds to S848. For example, a case is assumed where a green part E illustrated in FIG. 7B, that is, leaves of a tree is touched. In this case, it is possible to determine that the photographer demands to change a green color of the tree. For this reason, after the flow passes through S845 to S847, in S811, the system control unit 214 displays the character string "deepen green color/brighter • darker/color tone". It should be noted that the presence or absence of the flash light emission hardly affects the tree, the processing in S809 is omitted.

In S848, the system control unit 214 determines again whether or not the touch position is on the upper side. Specifically, when the coordinates of the variable TPOS are set as (Xtp, Ytp), for example, it is determined whether or not Ytp is higher than 0.6. In a case where the touch position is on the upper side, the flow proceeds to S849. The touch position is not on the upper side, the flow proceeds to S852.

After the flow passes through S849 to S851 or S852 to S854, in S811, the system control unit 214 displays the character string "blur • sharp/brighter • darker/color tone". It should be noted that, in a case where the flow passes through S849 to S851, that is, a case where the upper side of the screen is touched, since reach of the flash light emission has little effects, the processing in S809 is omitted. On the other hand, in a case where the flow passes through S852 to S854, that is, a case where the lower side of the screen is touched, since many subjects relatively close to the camera exist on the lower side of the screen and the effects of the flash light emission are large, "prohibit flash" is prioritized and displayed in a case where the flash light emission is performed.

FIG. 9 illustrates a relationship between the touch position and the demand of the photographer.

In FIGS. 9, 1 to 4 are displayed in the descending order of the high demands of the photographer with respect to the touch position. According to the present exemplary embodiment, not all of the demands including "focus here", "blur • sharp", "brighter • darker", "make sky blue", "deepen green color", "beautify skin", "color tone", "prohibit flash", "change color of sunset", "brighter corner", and the like are displayed. That is, since optimal demands are displayed on the basis of the touch position, the scene information, the ratio information of red, green, and blue, the presence or absence of the flash light emission, and the like, the photographer can easily select the demand.

Figure 10A:
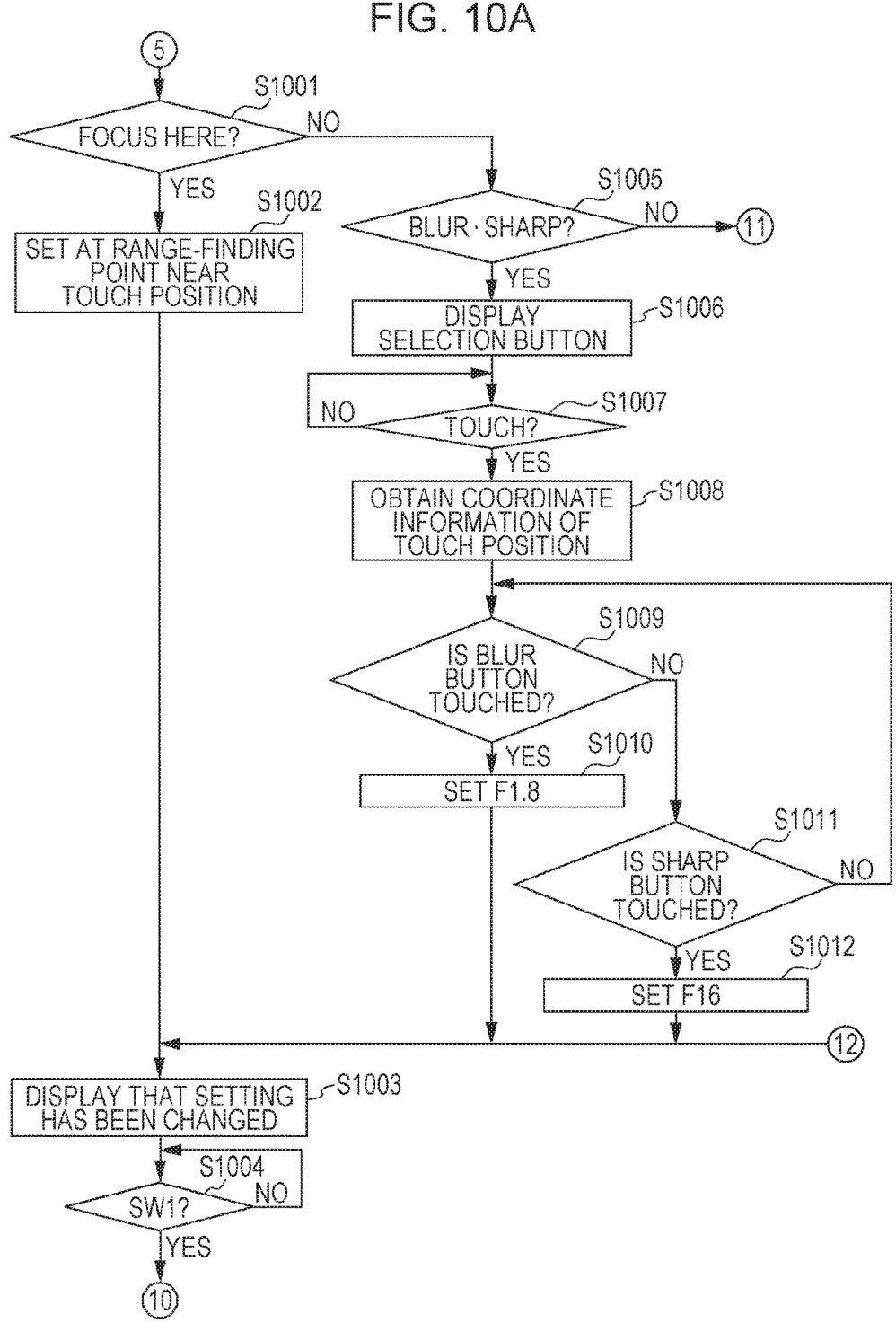
FIGS. 10A to 10C are flow charts illustrating processing of the image pickup control apparatus according to the first exemplary embodiment.
Figure 10B:
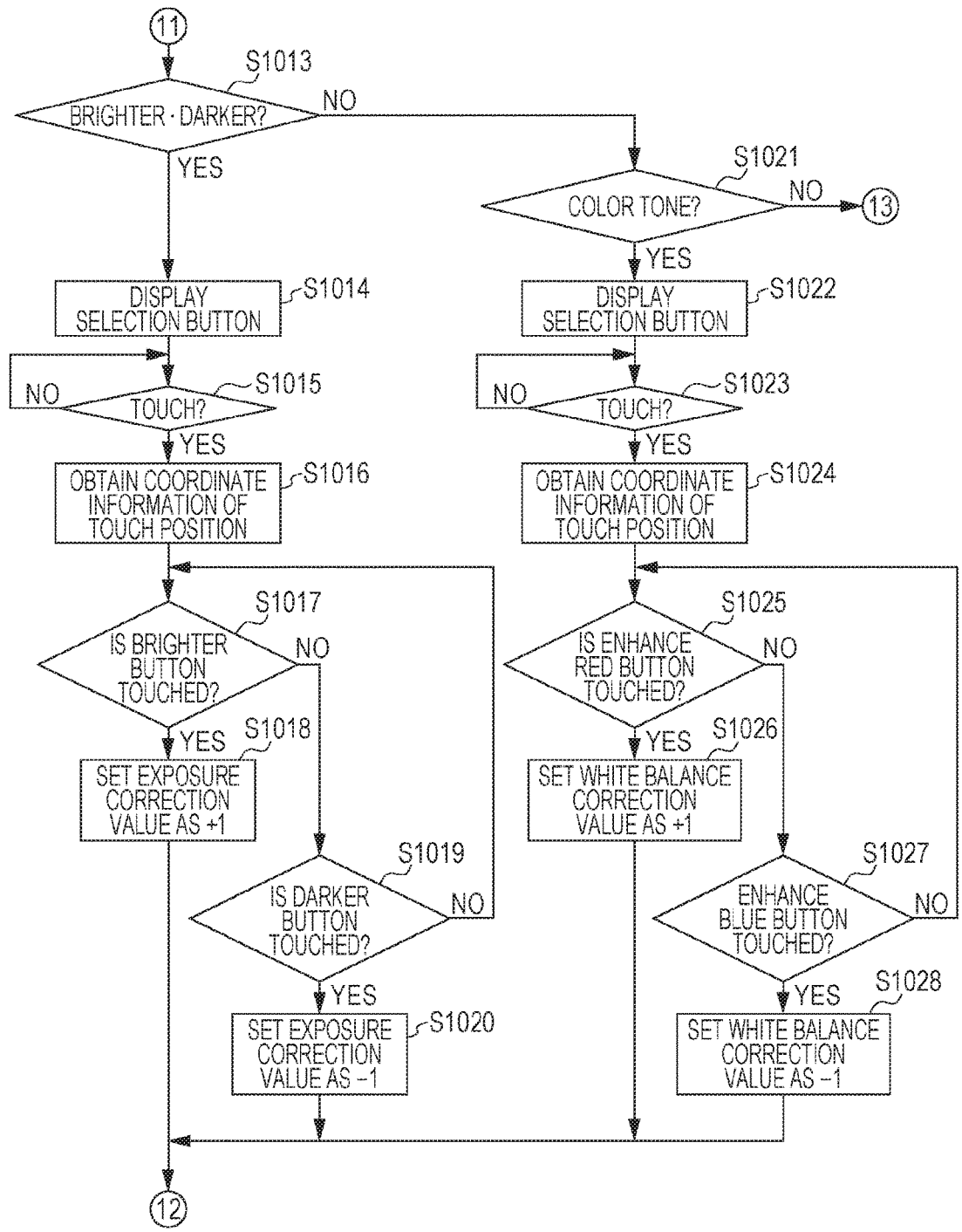
Figure 10C:
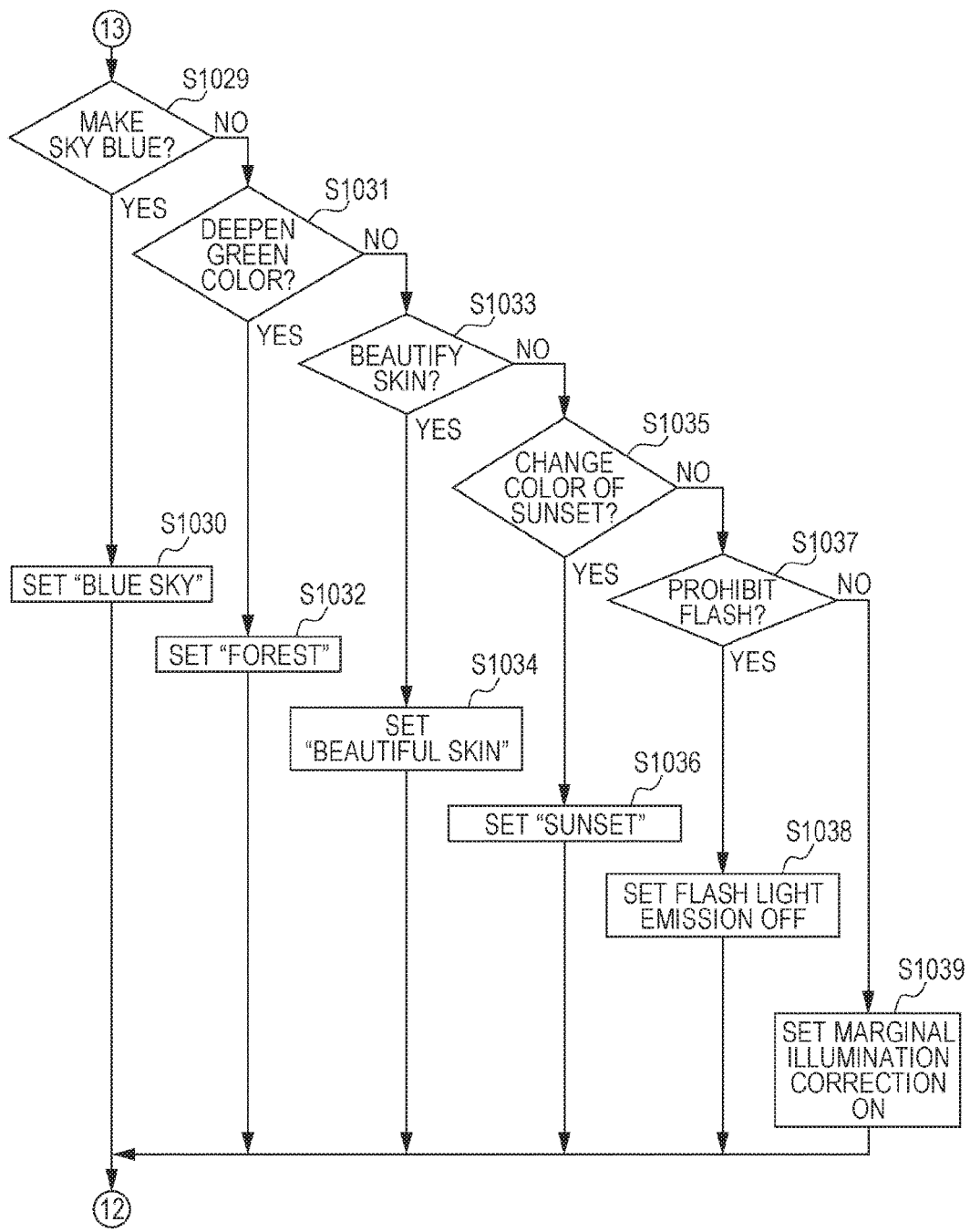

Next, in S815, S817, and S819, the demand selected by the photographer is stored in the variable DEM, and the flow proceeds to S1001 in the flow chart of FIG. 10A. Respective processings in the respective flow charts of FIGS. 10A to 10C are realized while the system control unit 214 expands the program stored in the non-volatile memory 220 into the system memory 221 and executes the program.

In S1001, the system control unit 214 determines whether or not the demand selected by the photographer is "focus here". Specifically, the system control unit 214 determines whether or not "focus here" is stored in the variable DEM. In a case where the demand is "focus here", the flow proceeds to S1002.

In S1002, the system control unit 214 sets the range-finding point closest to the touch position as an autofocus range-finding point. Specifically, the system control unit 214 calculates distances between the touch position and the respective range-finding points on the basis of the variable TPOS in which the coordinates of the touch position are stored and coordinates of the respective range-finding points. The system control unit 214 stores the number allocated to the range-finding point having the shortest distance among the calculated distances in the variable AFP. This processing corresponds to an example of processing by an assistance unit.

Figure 7D:
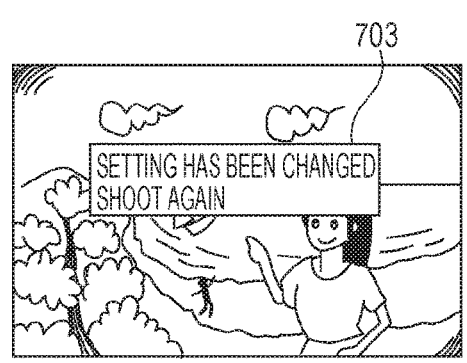

In S1003, the system control unit 214 displays that the setting of the display unit 105 has been changed. Specifically, as illustrated in FIG. 7D, the system control unit 214 displays a message 703 such as "Setting has been changed. Shoot again".

In S1004, the system control unit 214 determines whether or not the first shutter switch signal SW1 is generated, that is, the first shutter switch 224 is operated (the shutter button 101 is half pressed). In a case where the first shutter switch signal SW1 is generated, the flow returns to S403 in the flow chart of FIG. 4A. In a case where the first shutter switch signal SW1 is not generated, the flow stands by until the first shutter switch signal SW1 is generated. In a case where the flow returns to S403, in S404, the system control unit 214 performs autofocus at the range-finding point closest to the touch position.

In S1001, in a case where the demand is not "focus here", the flow proceeds to S1005. In S1005, the system control unit 214 determines whether or not the demand selected by the photographer is "blur • sharp". Specifically, the system control unit 214 determines whether or not "blur • sharp" is stored in the variable DEM. In a case where the demand is "blur • sharp", the flow proceeds to S1006.

Figure 7E:
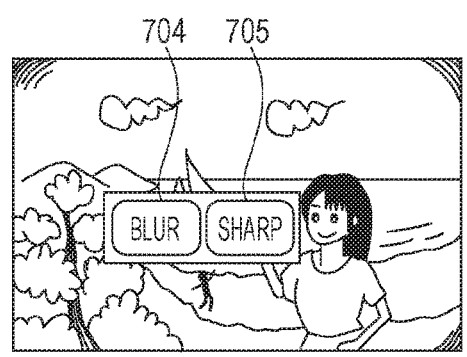

In S1006, the system control unit 214 displays a selection button for the photographer to select the demand on the display unit 105. Specifically, as illustrated in FIG. 7E, the system control unit 214 displays a "blur" button 704 and a "sharp" button 705.

In S1007, the system control unit 214 determines whether or not the display unit 105 is touched. In a case where the display unit 105 is touched, the flow proceeds to S1008. In a case where the display unit 105 is not touched, the flow stands by until the display unit 105 is touched.

In S1008, the system control unit 214 obtains the coordinates of the touch position via the touch panel 227.

In S1009, the system control unit 214 determines whether or not "blur" is selected, that is, whether or not an area of the "blur" button 704 is touched. In a case where "blur" is selected, the flow proceeds to S1010. In a case where "blur" is not selected, the flow proceeds to S1011.

In S1010, the system control unit 214 performs the setting such that a depth of field is shallow. Specifically, the system control unit 214 stores F1.8 in the variable PROG and changes the program for calculating the shutter speed and the aperture value. Thereafter, the flow proceeds from S1003 to S1004 and returns to S403 in the flow chart of FIG. 4A. After the flow returns to S403, in the flow chart of FIG. 5B illustrating the photometry calculation processing in S405, the system control unit 214 calculates the shutter speed and the aperture value in accordance with the aperture value F1.8 priority program line. Therefore, it is possible to shoot a photograph in which the background is blurred with the shallow depth of field.

In S1009, in a case where "blur" is not selected, the flow proceeds to S1011.

In S1011, the system control unit 214 determines whether or not "sharp" is selected, that is, whether or not an area of the "sharp" button 705 is touched. In a case where "sharp" is selected, the flow proceeds to S1012. In a case where "sharp" is not selected, the flow returns to S1009.

In S1012, the system control unit 214 performs the setting such that the depth of field is deep. Specifically, the system control unit 214 stores F16 in the variable PROG and changes the program for calculating the shutter speed and the aperture value. Thereafter, the flow proceeds from S1003 to S1004 and returns to S403 in the flow chart of FIG. 4A. After the flow returns to S403, in the flow chart of FIG. 5B illustrating the photometry calculation processing in S405, the system control unit 214 calculates the shutter speed and the aperture value in accordance with the aperture value F16 priority program line. Therefore, it is possible to shoot a photograph in which the background is sharp with the deep depth of field.

In S1005, in a case where the demand is not "blur • sharp", the flow proceeds to S1013. In S1013, the system control unit 214 determines whether or not the demand selected by the photographer is "brighter • darker". Specifically, the system control unit 214 determines whether or not "brighter • darker" is stored in the variable DEM. In a case where the demand is "brighter • darker", the flow flow proceeds to S1014.

In S1014 to S1020, similarly as in S1006 to S1012, the setting is changed in accordance with the demand of the photographer. That is, the system control unit 214 displays a "brighter" button and a "darker" button on the display unit 105. In a case where the photographer selects "brighter", the system control unit 214 stores +1 in the variable EXPADJ for selecting the exposure correction value to decrease the exposure value. In a case where the photographer selects "darker", the system control unit 214 stores −1 in the exposure correction value the variable EXPADJ to increase the exposure value. Thereafter, the flow passes through S1003 and S1004 and returns to S403. Then, the exposure value is calculated in S507 in the flow chart of FIG. 5B illustrating the photometry calculation processing in S405. At this time, since the exposure value is calculated by using the stored variable EXPADJ, it is possible to shoot a photograph which is brighter by one notch when "brighter" is selected, and it is possible to shoot a photograph which is darker by one notch when "darker" is selected.

In S1013, in a case where the demand is not "blur • sharp", the flow proceeds to S1021. In S1021, the system control unit 214 determines whether or not the demand selected by the photographer is "color tone". Specifically, the system control unit 214 determines whether or not "color tone" is stored in the variable DEM. In a case where the demand is "color tone", the flow proceeds to S1022.

In S1022 to S1028, similarly as in S1006 to S1012, the setting is changed in accordance with the demand of the photographer. That is, the system control unit 214 displays an "enhance red" button and an "enhance blue" button on the display unit 105. In a case where the photographer selects "enhance red", the system control unit 214 stores +1 in the variable WBADJ for selecting the white balance correction amount to generate redness. In a case where the photographer selects "enhance blue", the system control unit 214 stores −1 in the variable WBADJ for selecting the white balance correction amount to generate blueness. Thereafter, the flow passes through S1003 and S1004 and returns to S403. Then, white balance is performed in the development processing in S420. At this time, since the white balance is performed by using the stored variable WBADJ, it is possible to shoot a photograph in which red is enhanced by one notch in a case where "enhance red" is selected, and it is possible to shoot a photograph in which blue is enhanced by one notch in a case where "enhance blue" is selected.

In S1021, in a case where the demand is not "color tone", the flow proceeds to S1029.

In S1029, the system control unit 214 determines whether or not the demand selected by the photographer is "make sky blue". Specifically, the system control unit 214 determines whether or not "make sky blue" is stored in the variable DEM. In a case where the demand is "make sky blue", the flow proceeds to S1030.

In S1030, to emphasize blue in the sky, the system control unit 214 stores "blue sky" in the variable PARAM for selecting the development parameter. Thereafter, the flow passes through S1003 and S1004 and returns to S403. Then, the image processing in the development processing in S420 is performed. At this time, the system control unit 214 performs the image processing of setting a hue in which cyan is more emphasized than the standard by the development parameter "blue sky" stored in the variable PARAM and further emphasizing the sky.

In S1029, in a case where the demand is not "color tone", the flow proceeds to S1031.

In S1031, the system control unit 214 determines whether or not the demand selected by the photographer is "deepen green color". Specifically, the system control unit 214 determines whether or not "deepen green color" is stored in the variable DEM. In a case where the demand is "deepen green color", the flow proceeds to S1032.

In S1032, to emphasize green, the system control unit 214 stores "forest" in the variable PARAM for selecting the development parameter. Thereafter, the flow passes through S1003 and S1004 and returns to S403. Then, the image processing in the development processing in S420 is performed. At this time, the system control unit 214 performs the image processing of further emphasizing green by the development parameter "forest" stored in the variable PARAM.

In S1031, in a case where the demand is not "deepen green color", the flow proceeds to S1033.

In S1033, the system control unit 214 determines whether or not the demand selected by the photographer is "beautify skin". Specifically, the system control unit 214 determines whether or not "beautify skin" is stored in the variable DEM. In a case where the demand is "beautify skin", the flow proceeds to S1034.

In S1034, to emphasize the skin color, the system control unit 214 stores "beautiful skin" in the variable PARAM for selecting the development parameter. Thereafter, the flow passes through S1003 and S1004 and returns to S403. Then, the image processing in the development processing in S420 is performed. At this time, the system control unit 214 performs the image processing of further emphasizing the skin color by the development parameter "beautiful skin" stored in the variable PARAM.

In S1033, in a case where the demand is not "beautify skin", the flow proceeds to S1035.

In S1035, the system control unit 214 determines whether or not the demand selected by the photographer is "change color of sunset". Specifically, the system control unit 214 determines whether or not "change color of sunset" is stored in the variable DEM. In a case where the demand is "change color of sunset", the flow proceeds to S1036.

In S1036, to emphasize the red color of the sunset, the system control unit 214 stores "sunset" in the variable PARAM for selecting the development parameter. Thereafter, the flow passes through S1003 and S1004 and returns to S403. Then, the image processing in the development processing in S420 is performed. At this time, the system control unit 214 performs the image processing of further emphasizing the red color of the sunset by the development parameter "sunset" stored in the variable PARAM.

In S1035, in a case where the demand is not "change color of sunset", the flow proceeds to S1037.

In S1037, the system control unit 214 determines whether or not the demand selected by the photographer is "prohibit flash". Specifically, the system control unit 214 determines whether or not "prohibit flash" is stored in the variable DEM. In a case where the demand is "prohibit flash", the flow proceeds to S1038.

In S1038, the system control unit 214 sets the setting of the flash light emission as OFF, that is, the variable FLS for selecting the flash light emission is set as OFF. Thereafter, the flow passes through S1003 and S1004 and returns to S403. Then, in S406 and S415, it is determined that the variable FLS for selecting the flash light emission is not Auto. Therefore, the setting is made such that the flash 104 is not popped up, and also the flash 104 does not emit light in S417. Thus, it is possible to perform the shooting in which the flash light emission is not performed.

In S1037, in a case where the demand is not "prohibit flash", the flow proceeds to S1039. It can be assumed that the demand at a time when the flow proceeds to S1039 is the remaining demand "brighter corner". In S1039, to correct the marginal illumination, the system control unit 214 stores ON in the variable VIGADJ. Thereafter, the flow passes through S1003 and S1004 and returns to S403. Then, in S421, ON is stored in the variable VIGADJ, and the flow proceeds to S422. Therefore, the system control unit 214 can generate the image in which the illumination at the corner of the image is not decreased by correcting the marginal illumination.

In this manner, according to the present exemplary embodiment, the demands of the photographer are displayed on the basis of the touch position with respect to the image after the shooting, the parameter related to the shooting is set on the basis of the selected demand for the next shooting. Therefore, even the beginner can obtain the image on which the demand of the photographer is reflected in the next shooting.

In addition, according to the present exemplary embodiment, the image after the shooting, that is, the demand of the photographer with respect to the saved image data can be reflected in the next shooting. For example, in a case where the desired image quality processing is selected with respect to the image on the live view display as in the related art, even when the image on the live view display is just as imaged, the image after the actual shooting may be different from the desired finish by the flash light emission or the image processing in some cases. When the demand is selected with respect to the image after the shooting according to the present exemplary embodiment, the photographer can clearly determine the difference from the desired finish with respect to the image after the shooting and select the optimal demand.

Second Exemplary Embodiment

Next, a second exemplary embodiment will be described. According to the first exemplary embodiment, the case has been described where the system control unit 214 sets the parameter related to the shooting on the basis of the demand selected by the photographer for the next shooting. According to the present exemplary embodiment, a case will be described where the system control unit 214 recommends the parameter related to the shooting, that is, provides an advice on the basis of the demand of the photographer for the next shooting.

Figure 11B:
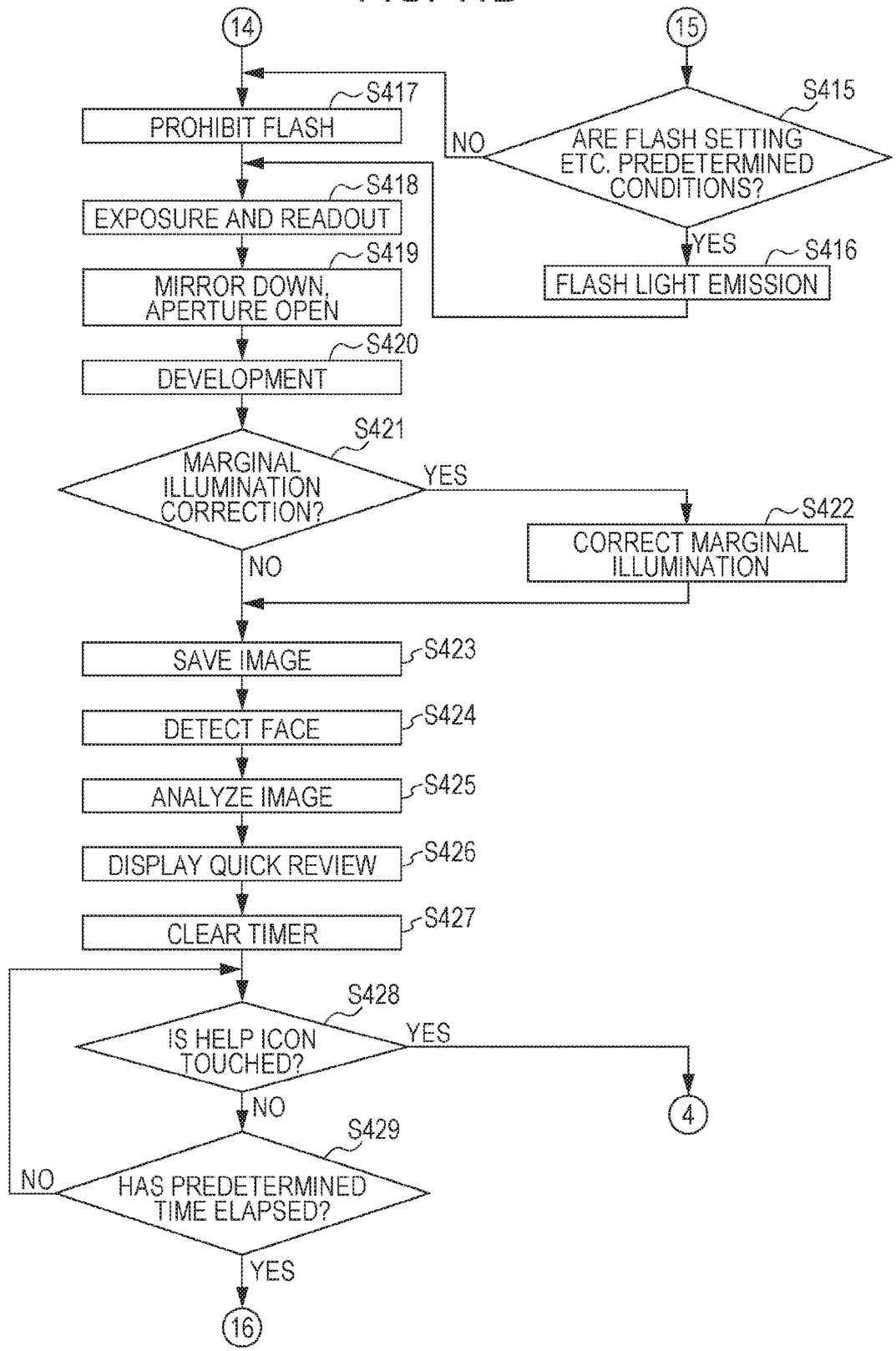

FIGS. 11A and 11B are flow charts illustrating the processing of the digital camera. Respective processings in the flow charts of FIGS. 11A and 11B are realized while the system control unit 214 expands the program stored in the non-volatile memory 220 into the system memory 221 and executes the program.

Herein, descriptions will be given of processing different from the flow charts of FIGS. 4A and 4B. In processing similar to the flow charts of FIGS. 4A and 4B, the same step numbers are allocated, and descriptions thereof will be appropriately omitted.

In S1101, the system control unit 214 determines whether or not the MENU button 113 is operated. In a case where the MENU button 113 is operated, the flow proceeds to S1102. In a case where the MENU button 113 is not operated, the flow proceeds to S1103.

In S1102, the system control unit 214 sets various parameters in accordance with the selection by the photographer. Specifically, as illustrated in FIG. 12, the system control unit 214 displays the various parameters on the display unit 105 as the menu screen. The photographer selects the parameter desired to be changed by using the four-way operational key 108 and presses the SET button 109 to confirm the selection. The system control unit 214 displays setting values included in the selected parameter in accordance with the press of the SET button 109 in a manner that the photographer can select the setting value. The photographer selects the setting value by using the four-way operational key 108 and confirms the selection of the setting value by pressing the SET button 109, so that the system control unit 214 sets the setting value of the selected parameter.

As illustrated in FIG. 12, the parameters include the range-finding point, the shooting mode, the exposure correction amount, the flash, the development parameter, the white balance, the white balance correction amount, the marginal illumination correction, and the like. It should be noted that, with regard to the range-finding point, auto select or selection of nine arbitrary range-finding points is set. Therefore, the system control unit 214 stores Auto or a range-finding point number in the variable AFP in accordance with the selection. With regard to the shooting mode, the program and the aperture priority can be set. In the exposure correction amount, any one of ±3 notches is selected, and the system control unit 214 stores the exposure correction amount in accordance with the selection in the variable EXPADJ. With regard to the flash, the auto light emission or the light emission prohibition is selected, and the system control unit 214 stores Auto or OFF in the variable FLS for selecting the flash light emission in accordance with the selection. With regard to the development parameter, any one of standard, sunset, blue sky, forest, beautiful skin, and the like is selected, and the system control unit 214 stores the development parameter in accordance with the selection in the variable PARAM. With regard to the white balance, any one of clear sky, shadow area, cloudy, light bulb, fluorescent light, and the like in addition to AWB is selected, and the system control unit 214 stores the type of the white balance in accordance with the selection in the variable WB. With regard to the white balance correction amount, any one of ±3 notches is selected, and the system control unit 214 stores the white balance correction amount in accordance with the selection in the variable WBADJ. With regard to the marginal illumination correction, any one of ON and OFF is selected, and the system control unit 214 stores ON or OFF in the marginal illumination correction in accordance with the selection in the variable VIGADJ.

In this manner, the photographer can change and set the setting value of the desired parameter.

In S1103, the system control unit 214 determines whether or not the first shutter switch signal SW1 is generated, that is, whether or not the first shutter switch 224 is operated (the shutter button 101 is half pressed). In a case where the first shutter switch signal SW1 is generated, the flow proceeds to S402. In a case where the first shutter switch signal SW1 is not generated, the flow returns to S1101.

Thereafter, in S403, in a case where the first shutter switch signal SW1 is not generated, the flow proceeds to S110, and the system control unit 214 determines whether or not a predetermined time has elapsed since the system timer 222 clears the timer. Herein, the predetermined time is, for example, 6 seconds. In a case where the predetermined time has elapsed, the flow returns to S1101 as different from the first exemplary embodiment, and the system control unit 214 determines again whether or not the MENU button 113 is operated.

On the other hand, in S403, in a case where the first shutter switch signal SW1 is generated, similarly as in the first exemplary embodiment, the system control unit 214 performs the operations of the autofocus, the photometry calculation, and the shooting.

In S420, the system control unit 214 reads out the RAW image stored in the memory control unit 216 and performs the color interpolation processing, the white balance processing, the color correction, or the like via the image processing unit 217. At this time, the system control unit 214 performs the image processing on the basis of the setting value of the parameter set in S1102. Specifically, the system control unit 214 performs the image processing on the basis of the variable PARAM for selecting the development parameter, the variable WB for selecting the type of the white balance, and the variable WBADJ for selecting the white balance correction amount. In addition, irrespective of the variable WB in which the type of the white balance is stored, the system control unit 214 stores the type of the white balance assumed from the result from the auto white balance in a variable WB_RES.

Figure 13A:
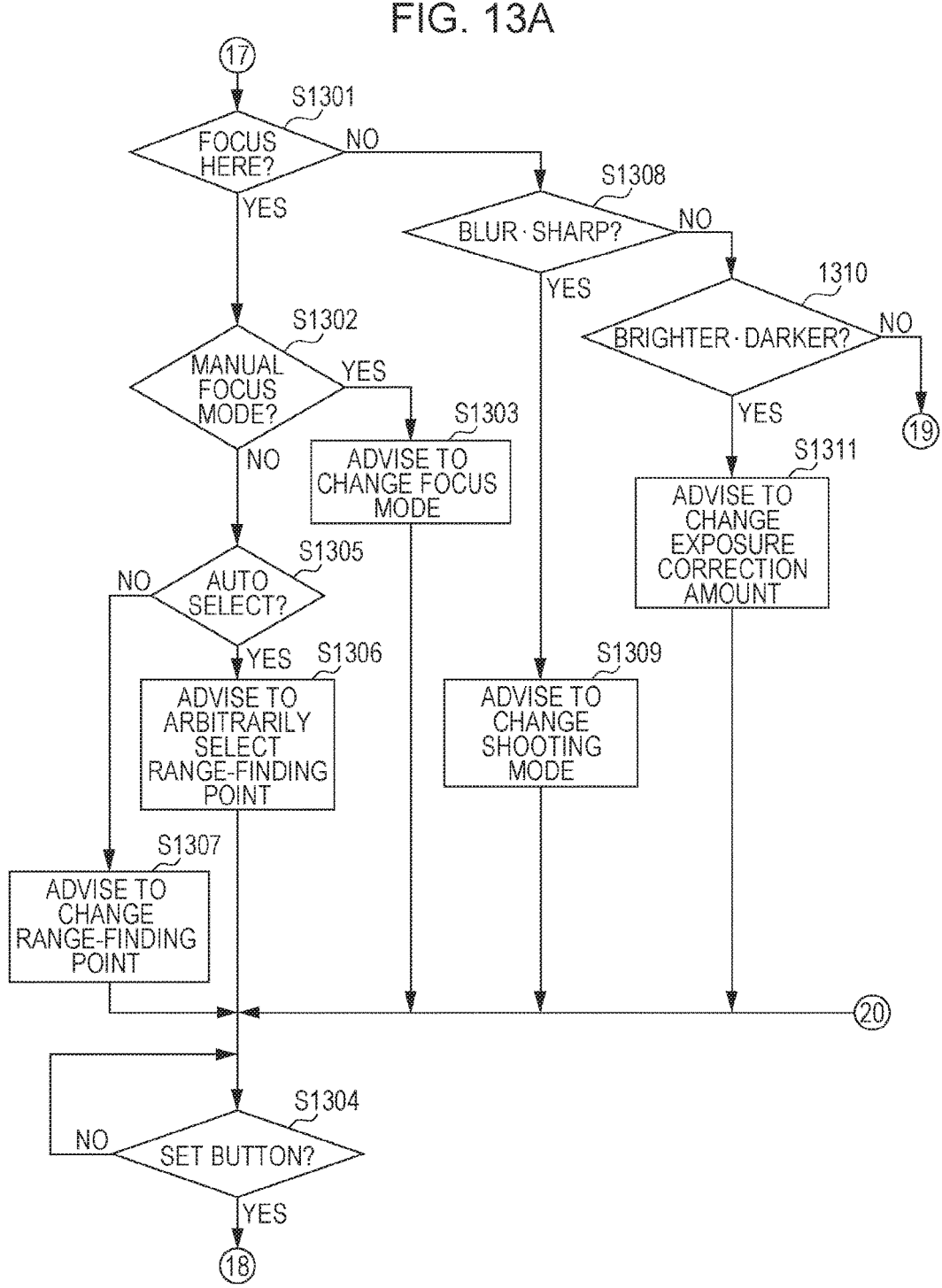
FIGS. 13A to 13C are flow charts illustrating processing of the image pickup control apparatus according to the second exemplary embodiment.
Figure 13B:
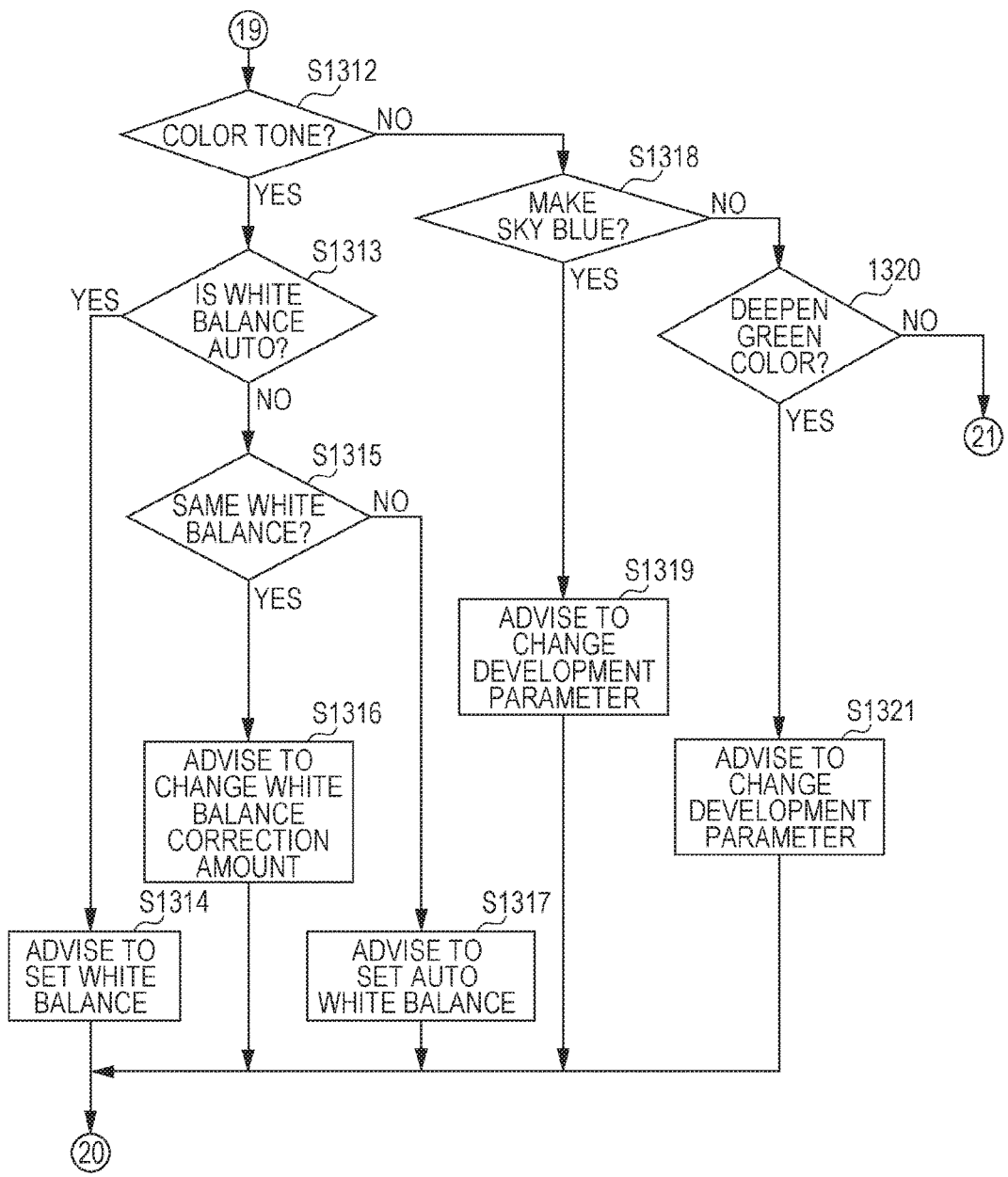
Figure 13C:
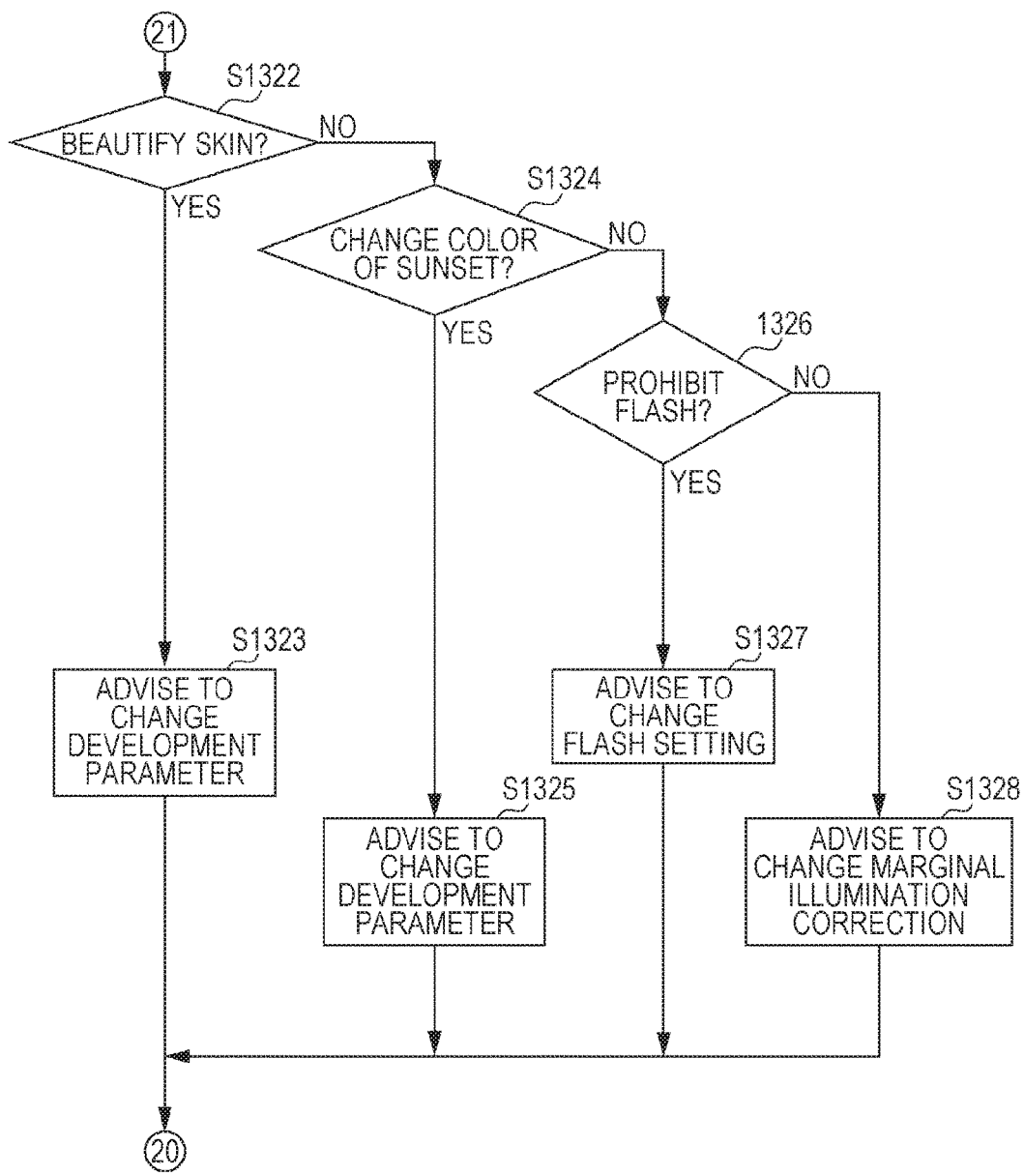

In S428, the system control unit 214 determines whether or not the help icon is selected. In a case where the help icon is selected, the flow proceeds to S801 in the flow chart of FIG. 8A. It should be noted that the flow charts of FIGS. 8A to 8C are similar to the second exemplary embodiment, and descriptions thereof will be omitted. Next, in S815, S817, or S819 in the flow chart of FIG. 8A, since the demand of the photographer is stored in the variable DEM, the flow proceeds to S1301 in the flow chart of FIG. 13A. Respective processings in the flow charts of FIG. 13A to 13C are realized while the system control unit 214 expands the program stored in the non-volatile memory 220 into the system memory 221 and executes the program.

In S1301, the system control unit 214 determines whether or not the demand selected by the photographer is "focus here". Specifically, the system control unit 214 determines whether or not "focus here" is stored in the variable DEM. In a case where the demand is "focus here", the flow proceeds to S1302.

In S1302, the system control unit 214 determines whether or not a manual focus mode is set as a focus mode of the lens group 203. In the case of the manual focus mode, the flow proceeds to S1303. In the case of the autofocus mode, the flow proceeds to S1305.

Figure 7F:
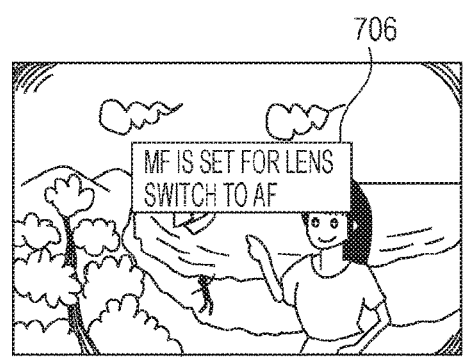

In S1303, the system control unit 214 displays an advice to change the focus mode. Specifically, as illustrated in FIG. 7F, the system control unit 214 displays a message 706 "MF is set for the lens. Switch to AF" or the like in the center of the screen of the display unit 105 to notify the photographer that the manual focus mode is set. In the case of the beginner, without noticing that the manual focus mode is set as the focus mode, the shooting may be continued in some cases while the beginner feels dissatisfaction with out of focus. Therefore, the photographer who has the demand "focus here" is advised to switch to the autofocus mode.

In S1304, the system control unit 214 stands by until the photographer checks the advice. Specifically, the system control unit 214 stands by until the SET button 109 is pressed. In a case where the SET button 109 is pressed, the flow returns to S1101 in the flow chart of FIG. 11A. Therefore, since the flow proceeds from S1101 to S1102, the photographer can set the parameter again.

In S1302, in a case where the focus mode is not the manual focus mode, the flow proceeds to S1305. In S1305, the system control unit 214 determines whether or not the setting of the range-finding point is auto select. Specifically, the system control unit 214 determines whether or not Auto is stored in the variable AFP. In the case of auto select, the flow proceeds to S1306.

In S1306, the system control unit 214 displays an advice to change the range-finding point to arbitrary select. Specifically, the system control unit 214 displays "set arbitrary select for the range-finding point in the menu" or the like on the display unit 105. In this manner, the photographer is advised that the in-focus position can be changed by changing the selection of the range-finding point. Thereafter, the flow passes through S1304 and returns to S1101 in the flow chart of FIG. 11A.

In S1305, in a case where the setting of the range-finding point is not auto select, the flow proceeds to S1307.

In S1307, the system control unit 214 advises the photographer to change the range-finding point. Specifically, the system control unit 214 displays "change the range-finding point in the menu" or the like on the display unit 105. Herein, the photographer has already set the setting of the range-finding point to arbitrary select and selected the range-finding point. Therefore, it can be assumed that the photographer forgets to restore the setting while the range-finding point is changed, and the photographer is advised to change the in-focus position again. Thereafter, the flow passes through S1304 and returns to S1101 in the flow chart of FIG. 11A.

In S1301, in a case where the demand is not "focus here", the flow proceeds to S1308.

In S1308, the system control unit 214 determines whether or not the demand selected by the photographer is "blur•sharp". In a case where the demand is "blur•sharp", the flow proceeds to S1309.

In S1309, the system control unit 214 advises the photographer to change the shooting mode. Specifically, the system control unit 214 displays "set the aperture priority as the shooting mode in the menu in the display unit 105. When the aperture is open, the image becomes blurred. When the aperture is stopped down, the image becomes sharp" or the like. In this manner, the photographer is advised that blur • sharp can be set by changing the shooting mode to the aperture priority that. Thereafter, the flow passes through S1304 and returns to S1101 in the flow chart of FIG. 11A.

In S1308, in a case where the demand is not "blur•sharp", the flow proceeds to S1310. In S1310, the system control unit 214 determines whether or not the demand selected by the photographer is "brighter•darker". In a case where the demand is "brighter•darker", the flow proceeds to S1311.

In S1311, the system control unit 214 advises the photographer to change the exposure correction amount. Specifically, the system control unit 214 displays a message on the display unit 105 such as "Change the exposure correction amount in the menu. The image is shot to be brighter when + is set and to be darker when − is set". Since the beginner may not recognize in some cases that the operation for setting the image to be brighter or darker is the exposure correction, the photographer is advised that the image can be set to be brighter or darker by changing the exposure correction amount. At this time, it is also preferably displayed that + is to make the image brighter and − is to make the image darker. Thereafter, the flow passes through S1304 and returns to S1101 in the flow chart of FIG. 11A.

In S1310, in a case where the demand is not "brighter • darker", the flow proceeds to S1312.

In S1312, the system control unit 214 determines whether or not the demand selected by the photographer is "color tone". In a case where the demand is "color tone", the flow proceeds to S1313.

In S1313, the system control unit 214 determines whether or not the variable WB for selecting the type of the white balance is Auto. In a case where Auto is auto, the flow proceeds to S1314.

In S1314, the system control unit 214 advises the photographer to set the white balance. Specifically, the system control unit 214 displays "set the white balance in the menu" or the like on the display unit 105. In this manner, the photographer is advised that the hue can be changed by setting the white balance.

In S1313, in a case where the variable WB for selecting the type of the white balance is not Auto, the flow proceeds to S1315.

In S1315, the system control unit 214 determines whether or not the variable WB for selecting the type of the white balance is the same as the variable WB_RES. In a case where the variable WB is the same as the variable WB_RES, the flow proceeds to S1316.

In S1316, the system control unit 214 advises the photographer to change the white balance correction amount. Specifically, the system control unit 214 displays "change the white balance correction amount in the menu" or the like on the display unit 105. In a case where the variable WB for selecting the type of the white balance is the same as the variable WB_RES and the demand is "color tone", a case can be assumed where the photographer feels dissatisfaction with the hue even though the selected white balance is correct, and the photographer desires to make a subtle change to the hue. Therefore, the photographer is advised that the subtle change can be made to the hue by changing the white balance correction amount (guidance display). Thereafter, the flow passes through S1304 and returns to S1101 in the flow chart of FIG. 11A.

In S1315, in a case where the variable WB for selecting the type of the white balance is not the same as the variable WB_RES, the flow proceeds to S1317.

In S1317, the system control unit 214 advises the photographer to set AWB, that is, Auto as the type of the white balance. Specifically, the system control unit 214 displays a message on the display unit 105 such as "The type of the white balance is "WB". Change the type of the white balance to AWB in the menu". Herein, "WB" is displayed by converting the type of the white balance stored in the variable WB into the character string. For example, in a case where the type of the white balance is "fluorescent light", "the type of the white balance fluorescent light" is displayed. Herein, in a case where the type of the white balance set by the photographer is different from the type of the white balance calculated by the auto white balance and assumed and the demand is "color tone", a case can be assumed that the photographer forgets to restore the previously set white balance. Therefore, the photographer is advised to change the type of the white balance to AWB, so that it is possible to make the photographer notice that the photographer forgets to restore the previously set white balance. Thereafter, the flow passes through S1304 and returns to S1101 in the flow chart of FIG. 11A.

In S1312, in a case where the demand is not "color tone", the flow proceeds to S1318.

In S1318, the system control unit 214 determines whether or not the demand selected by the photographer is "make sky blue". In a case where the demand is "make sky blue", the flow proceeds to S1319, and the system control unit 214 advises the photographer to change the development parameter. Specifically, the system control unit 214 displays "set blue sky as the development parameter in the menu" or the like on the display unit 105. In this manner, the photographer is advised that the sky can be made blue by changing the development parameter.

In S1318, in a case where the demand is not "make sky blue", the flow proceeds to S1320.

In S1320, the system control unit 214 determines whether or not the demand selected by the photographer is "deepen green color". In a case where the demand is "deepen green color", in S1321, the system control unit 214 displays "set forest as the development parameter in the menu" or the like.

In S1322, the system control unit 214 determines whether or not the demand selected by the photographer is "beautify skin". In a case where the demand is "beautify skin", in S1323, the system control unit 214 displays "set beautiful skin as the development parameter in the menu" or the like.

In S1324, the system control unit 214 determines whether or not the demand selected by the photographer is "change color of sunset". In a case where the demand is "change color of sunset", in S1325, the system control unit 214 displays "set sunset as the development parameter in the menu" or the like.

In this manner, the photographer is advised that the hue can be changed by changing the development parameter. Thereafter, the flow passes through S1304 and returns to S1101 in the flow chart of FIG. 11A.

In S1324, in a case where the demand is not "change color of sunset", the flow proceeds to S1326.

In S1326, the system control unit 214 determines whether or not the demand selected by the photographer is "prohibit flash". In a case where the demand is "prohibit flash", the flow proceeds to S1327.

In S1327, the system control unit 214 advises the photographer to change the flash setting. Specifically, the system control unit 214 displays "set light emission prohibition by the flash in the menu" or the like on the display unit 105. In this manner, the photographer is advised that the flash light emission can be prohibited. Thereafter, the flow passes through S1304 and returns to S1101 in the flow chart of FIG. 11A.

In S1326, in a case where the demand is not "prohibit flash", the flow proceeds to S1328.

In S1328, the system control unit 214 advises the photographer to change the marginal illumination correction. Specifically, the system control unit 214 displays "set the marginal illumination correction to be ON in the menu" or the like on the display unit 105. In this manner, the photographer is advised that the corner of the image can be made brighter by setting the marginal illumination correction to be ON. Thereafter, the flow passes through S1304 and returns to S1101 in the flow chart of FIG. 11A.

In this manner, according to the present exemplary embodiment, the parameter related to the shooting is recommended on the basis of the demand of the photographer for the next shooting. Therefore, while the photographer sets the parameter in accordance with the recommendation by itself, even the beginner can obtain the image on which the demand of the photographer is reflected. In particular, according to the present exemplary embodiment, it is possible to notify the photographer that the setting is an erroneous setting on the basis of the demand of the photographer even in a case where the photographer forgets to restore the setting while the focus mode is kept changed to the manual focus mode or the type of the white balance is kept changed.

The present invention has been described in detail above on the basis of the exemplary embodiments, but the present invention is not limited to these particular exemplary embodiments. Various modes within a range without departing from the gist of this invention are also included in the present invention. Furthermore, the above-described respective exemplary embodiments are merely an exemplary embodiment of the present invention, and the respective exemplary embodiments can also be appropriately combined with each other.

It should be noted that the control by the system control unit 214 may be performed by single hardware, or plural pieces of hardware may share the processings and control the entire apparatus.

In addition, according to the above-described exemplary embodiment, the descriptions have been given of the case where the present invention is applied to the image pickup control apparatus such as the digital camera 100 as an example, but the present invention is not limited to this case. That is, the present invention may include a personal digital assistance (PDA), a mobile phone terminal, a tablet, a portable image viewer, a game machine, or the like which includes a lens or an image pickup element.

In addition, the present invention can be applied to the image pickup control apparatus that can remotely instruct the image pickup apparatus such as the digital camera 100 to perform the shooting or receive the image picked up by the digital camera 100 to be displayed. That is, the present invention include a personal computer, a PDA, a mobile phone terminal, a tablet, a portable image viewer, a game machine, or the like which does not include a lens or an image pickup element but can remotely instruct the shooting.

Other Exemplary Embodiments

The present invention can also be realized by the following processing. That is, a program that realizes one or more functions according to the above-described exemplary embodiments is supplied to an image pickup control apparatus via a network or a recording medium, and one or more processors in a computer of the image pickup control apparatus read out and execute the program. The present invention can also be realized by a circuit (for example, an application specific integrated circuit (ASIC)) that realizes one or more functions according to the above-described exemplary embodiments.

In addition, according to the above-described exemplary embodiment, the case has been described in which the photographer performs the input while the unsatisfied position in the image displayed on the display unit 105 is directly touched, but the configuration is not limited to this case. For example, the photographer may move an arrow or the like displayed while being overlapped with an image by using the four-way operational key 108 and perform an input by pressing the SET button 109 at the unsatisfied position or the like.

In addition, according to the above-described exemplary embodiment, the case has been described in which the selection is made while the photographer directly touches the demand of the photographer displayed on the display unit 105, but the configuration is not limited to this case. For example, the photographer may move a cursor or the like displayed while being overlapped with display of a demand of the photographer by using the four-way operational key 108 and perform a selection by pressing the SET button 109 in a state in which the cursor is overlapped with the display of the desired demand or the like.

In addition, according to the above-described second exemplary embodiment, the case has been described in which the recommendation of the parameter related to the shooting may be displayed by way of the message on the display unit 105, but the configuration is not limited to this case. The recommendation may be provided by using audio or the like.

According to the exemplary embodiments of the present invention, it is possible to obtain the image on which the demand of the photographer with respect to the image after the shooting is reflected.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like. While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-122992, filed Jun. 18, 2015, which is hereby incorporated by reference herein in its entirety.

What is claimed is:

1. An image pickup control apparatus comprising a memory and at least one processor which function as:
   an instruction unit configured to instruct an image pickup unit to shoot an image in accordance with an operation of a photographer;
   a first display processing unit configured to display the image shot by the image pickup unit in accordance with an instruction by the instruction unit;
   an obtaining unit configured to obtain position information input by the photographer with respect to the image displayed by the first display processing unit;
   a second display processing unit configured to display options based on the position information obtained by the obtaining unit; and
   an assistance unit configured to perform an assistance including at least one of setting of a parameter for next shooting and guidance display of a parameter related to shooting based on an option selected by the photographer from among the options displayed by the second display processing unit,
   wherein, in response to a position indicated by the position information obtained by the obtaining unit being at a distance within a threshold from an in-focus position in the image displayed by the first display processing unit, the second display processing unit displays an option related to a setting of an exposure correction value.

2. The image pickup control apparatus according to claim 1,
   wherein the instruction unit includes:
      a first instruction unit configured to instruct the image pickup unit to perform shooting preparation in accordance with an operation of the photographer, and
      a second instruction unit configured to instruct the image pickup unit to perform image shooting in accordance with an operation of the photographer after the first instruction unit has issued the instruction, and
   wherein the first display processing unit displays an image shot by the image pickup unit in accordance with an instruction of the second instruction unit.

3. The image pickup control apparatus according to claim 1, the memory and at least one processor further functions as:
   an estimation unit configured to estimate demands of the photographer based on at least one of a shooting condition and image information, and the position information obtained by the obtaining unit,
   wherein the second display processing unit displays options indicating the demands of the photographer estimated by the estimation unit.

4. The image pickup control apparatus according to claim 3,
   wherein the shooting condition is that flash light emission is performed or that flash light emission is not performed, and
   wherein the image information is scene information of the image shot by the image pickup unit or ratio information of red, green, and blue of the image.

5. The image pickup control apparatus according to claim 3, wherein the second display processing unit sorts and displays the demand estimated by the estimation unit based on the shooting condition.

6. The image pickup control apparatus according to claim 3, wherein the estimation unit estimates the demand of the photographer based on at least any one of whether the position information obtained by the obtaining unit is in a neighborhood of a face of a subject, whether the position information is in a neighborhood of a range-finding point, whether the position information is in a neighborhood of a golden section frame, whether the position information is in one of four corners of the image, and whether the position information is on an upper side of the image.

7. The image pickup control apparatus according to claim 1, wherein the second display processing unit displays the options at a position different from the position information obtained by the obtaining unit.

8. The image pickup control apparatus according to claim 1, wherein the assistance unit sets the parameter related to the shooting based on the option selected by the photographer.

9. The image pickup control apparatus according to claim 1, wherein the assistance unit performs the guidance display of the parameter related to the shooting based on the option selected by the photographer.

10. The image pickup control apparatus according to claim 8, wherein the parameter related to the shooting is at least one of parameters indicating a range-finding point, a shooting mode, an exposure correction amount, a flash, a development parameter, a type of white balance, a white balance correction amount, and a marginal illumination correction.

11. The image pickup control apparatus according to claim 1, wherein, in response to a position indicated by the position information obtained by the obtaining unit being at a distance within a threshold from a face detected from the image displayed by the first display processing unit and also not being at a distance within a threshold from an in-focus position, the second display processing unit displays an option for setting a focus adjustment position to be at a position based on the position indicated by the position information obtained by the obtaining unit.

12. The image pickup control apparatus according to claim 1, wherein, in response to a predetermined condition including a state in which a position indicated by the position information obtained by the obtaining unit being at a distance within a threshold from a face detected from the image displayed by the first display processing unit being satisfied, the second display processing unit displays an option for adjusting a skin color.

13. The image pickup control apparatus according to claim 12, wherein the predetermined condition is that flash light emission is not performed.

14. The image pickup control apparatus according to claim 1, wherein, in response to a position indicated by the position information obtained by the obtaining unit not being at a distance within a threshold from a face detected from the image displayed by the first display processing unit and also being within a rectangular frame obtained by dividing the image displayed by the first display processing unit by a golden ratio, the second display processing unit displays an option for setting a focus adjustment position to be at a position based on the position indicated by the position information obtained by the obtaining unit,
   wherein the golden ratio is 1:0.6, wherein a ratio of a length between a center of a rectangular image and an upper end of the rectangular image to a length between the center of the rectangular image and an upper side of the rectangular frame is 1:0.6, wherein a ratio of a length between the center of the rectangular image and a lower end of the rectangular image to a length between the center of the rectangular image and a lower side of the rectangular frame is 1:0.6, wherein a ratio of a length between the center of the rectangular image and a left end of the rectangular image to a length between the center of the rectangular image and a left side of the rectangular frame is 1:0.6, and wherein a ratio of a length between the center of the rectangular image and a right end of the rectangular image to a length between the center of the rectangular image and a right side of the rectangular frame is 1:0.6.

15. An image pickup control method for an image pickup control apparatus, the image pickup control method comprising:

instructing an image pickup unit to shoot an image in accordance with an operation of a photographer;

displaying the image shot by the image pickup unit in accordance with an instruction in the instructing;

obtaining position information input by the photographer with respect to the displayed image;

displaying options based on the obtained position information;

performing an assistance including at least one of setting of a parameter for next shooting and guidance display of a parameter related to shooting based on an option selected by the photographer from among the displayed options; and in response to a position indicated by the obtained position information being at a distance within a threshold from an in-focus position in the image displayed, displaying an option related to a setting of an exposure correction value.

16. A non-transitory computer-readable recording medium that stores a program that when executed by a processor causes a computer to function as:

an instruction unit configured to instruct an image pickup unit to shoot an image in accordance with an operation of a photographer;

a first display processing unit configured to display the image shot by the image pickup unit in accordance with an instruction by the instruction unit;

an obtaining unit configured to obtain position information input by the photographer with respect to the image displayed by the first display processing unit;

a second display processing unit configured to display options based on the position information obtained by the obtaining unit; and an assistance unit configured to perform an assistance including at least one of setting of a parameter for next shooting and guidance display of a parameter related to shooting based on an option selected by the photographer from among the options displayed by the second display processing unit, wherein, in response to a position indicated by the position information obtained by the obtaining unit being at a distance within a threshold from an in-focus position in the image displayed by the first display processing unit, the second display processing unit displays an option related to a setting of an exposure correction value.

17. An image pickup control apparatus comprising a memory and at least one processor which function as:

an instruction unit configured to instruct an image pickup unit to shoot an image in accordance with an operation of a photographer;

a first display processing unit configured to display the image shot by the image pickup unit in accordance with an instruction by the instruction unit;

an obtaining unit configured to obtain position information input by the photographer with respect to the image displayed by the first display processing unit;

a second display processing unit configured to display options based on the position information obtained by the obtaining unit; and an assistance unit configured to perform an assistance including at least one of setting of a parameter for next shooting and guidance display of a parameter related to shooting based on an option selected by the photographer from among the options displayed by the second display processing unit, wherein, in response to a position indicated by the position information obtained by the obtaining unit being at a distance within a threshold from a face detected from the image displayed by the first display processing unit and also not being at a distance within a threshold from an in-focus position, the second display processing unit displays an option for setting a focus adjustment position to be at a position based on the position indicated by the position information obtained by the obtaining unit.

18. An image pickup control apparatus comprising a memory and at least one processor which function as:

an instruction unit configured to instruct an image pickup unit to shoot an image in accordance with an operation of a photographer;

a first display processing unit configured to display the image shot by the image pickup unit in accordance with an instruction by the instruction unit;

an obtaining unit configured to obtain position information input by the photographer with respect to the image displayed by the first display processing unit;

a second display processing unit configured to display options based on the position information obtained by the obtaining unit; and an assistance unit configured to perform an assistance including at least one of setting of a parameter for next shooting and guidance display of a parameter related to shooting based on an option selected by the photographer from among the options displayed by the second display processing unit, wherein, in response to a predetermined condition including a state in which a position indicated by the position information obtained by the obtaining unit being at a distance within a threshold from a face detected from the image displayed by the first display processing unit being satisfied, the second display processing unit displays an option for adjusting a skin color.

19. An image pickup control apparatus comprising a memory and at least one processor which function as:

an instruction unit configured to instruct an image pickup unit to shoot an image in accordance with an operation of a photographer;

a first display processing unit configured to display the image shot by the image pickup unit in accordance with an instruction by the instruction unit;

an obtaining unit configured to obtain position information input by the photographer with respect to the image displayed by the first display processing unit;
a second display processing unit configured to display options based on the position information obtained by the obtaining unit; and
an assistance unit configured to perform an assistance including at least one of setting of a parameter for next shooting and guidance display of a parameter related to shooting based on an option selected by the photographer from among the options displayed by the second display processing unit,
wherein, in response to a position indicated by the position information obtained by the obtaining unit not being at a distance within a threshold from a face detected from the image displayed by the first display processing unit and also being within a rectangular frame obtained by dividing the image displayed by the first display processing unit by a golden ratio, the second display processing unit displays an option for setting a focus adjustment position to be at a position based on the position indicated by the position information obtained by the obtaining unit,
wherein the golden ratio is 1:0.6,
wherein a ratio of a length between a center of a rectangular image and an upper end of the rectangular image to a length between the center of the rectangular image and an upper side of the rectangular frame is 1:0.6,
wherein a ratio of a length between the center of the rectangular image and a lower end of the rectangular image to a length between the center of the rectangular image and a lower side of the rectangular frame is 1:0.6,
wherein a ratio of a length between the center of the rectangular image and a left end of the rectangular image to a length between the center of the rectangular image and a left side of the rectangular frame is 1:0.6, and
wherein a ratio of a length between the center of the rectangular image and a right end of the rectangular image to a length between the center of the rectangular image and a right side of the rectangular frame is 1:0.6.

20. An image pickup control method for an image pickup control apparatus, the image pickup control method comprising:
instructing an image pickup unit to shoot an image in accordance with an operation of a photographer;
displaying the image shot by the image pickup unit in accordance with an instruction in the instructing;
obtaining position information input by the photographer with respect to the displayed image;
displaying options based on the obtained position information;
performing an assistance including at least one of setting of a parameter for next shooting and guidance display of a parameter related to shooting based on an option selected by the photographer from among the displayed options; and
in response to a position indicated by the obtained position information being at a distance within a threshold from a face detected from the image displayed and also not being at a distance within a threshold from an in-focus position, displaying an option for setting a focus adjustment position to be at a position based on the position indicated by the obtained position information.

21. An image pickup control method for an image pickup control apparatus, the image pickup control method comprising:
instructing an image pickup unit to shoot an image in accordance with an operation of a photographer;
displaying the image shot by the image pickup unit in accordance with an instruction in the instructing;
obtaining position information input by the photographer with respect to the displayed image;
displaying options based on the obtained position information;
performing an assistance including at least one of setting of a parameter for next shooting and guidance display of a parameter related to shooting based on an option selected by the photographer from among the displayed options; and
in response to a predetermined condition including a state in which a position indicated by the obtained position information being at a distance within a threshold from a face detected from the image displayed being satisfied, displaying an option for adjusting a skin color.

22. An image pickup control method for an image pickup control apparatus, the image pickup control method comprising:
instructing an image pickup unit to shoot an image in accordance with an operation of a photographer;
displaying the image shot by the image pickup unit in accordance with an instruction in the instructing;
obtaining position information input by the photographer with respect to the displayed image;
displaying options based on the obtained position information;
performing an assistance including at least one of setting of a parameter for next shooting and guidance display of a parameter related to shooting based on an option selected by the photographer from among the displayed options; and
in response to a position indicated by the obtained position information not being at a distance within a threshold from a face detected from the image displayed and also being within a rectangular frame obtained by dividing the image displayed by a golden ratio, displaying an option for setting a focus adjustment position to be at a position based on the position indicated by the obtained position information,
wherein the golden ratio is 1:0.6,
wherein a ratio of a length between a center of a rectangular image and an upper end of the rectangular image to a length between the center of the rectangular image and an upper side of the rectangular frame is 1:0.6,
wherein a ratio of a length between the center of the rectangular image and a lower end of the rectangular image to a length between the center of the rectangular image and a lower side of the rectangular frame is 1:0.6,
wherein a ratio of a length between the center of the rectangular image and a left end of the rectangular image to a length between the center of the rectangular image and a left side of the rectangular frame is 1:0.6, and
wherein a ratio of a length between the center of the rectangular image and a right end of the rectangular image to a length between the center of the rectangular image and a right side of the rectangular frame is 1:0.6.

23. A non-transitory computer-readable recording medium that stores a program that when executed by a processor causes a computer to function as:

an instruction unit configured to instruct an image pickup unit to shoot an image in accordance with an operation of a photographer;

a first display processing unit configured to display the image shot by the image pickup unit in accordance with an instruction by the instruction unit;

an obtaining unit configured to obtain position information input by the photographer with respect to the image displayed by the first display processing unit;

a second display processing unit configured to display options based on the position information obtained by the obtaining unit; and an assistance unit configured to perform an assistance including at least one of setting of a parameter for next shooting and guidance display of a parameter related to shooting based on an option selected by the photographer from among the options displayed by the second display processing unit, wherein, in response to a position indicated by the position information obtained by the obtaining unit being at a distance within a threshold from a face detected from the image displayed by the first display processing unit and also not being at a distance within a threshold from an in-focus position, the second display processing unit displays an option for setting a focus adjustment position to be at a position based on the position indicated by the position information obtained by the obtaining unit.

24. A non-transitory computer-readable recording medium that stores a program that when executed by a processor causes a computer to function as:

an instruction unit configured to instruct an image pickup unit to shoot an image in accordance with an operation of a photographer;

a first display processing unit configured to display the image shot by the image pickup unit in accordance with an instruction by the instruction unit;

an obtaining unit configured to obtain position information input by the photographer with respect to the image displayed by the first display processing unit;

a second display processing unit configured to display options based on the position information obtained by the obtaining unit; and an assistance unit configured to perform an assistance including at least one of setting of a parameter for next shooting and guidance display of a parameter related to shooting based on an option selected by the photographer from among the options displayed by the second display processing unit, wherein, in response to a predetermined condition including a state in which a position indicated by the position information obtained by the obtaining unit being at a distance within a threshold from a face detected from the image displayed by the first display processing unit being satisfied, the second display processing unit displays an option for adjusting a skin color.

25. A non-transitory computer-readable recording medium that stores a program that when executed by a processor causes a computer to function as:

an instruction unit configured to instruct an image pickup unit to shoot an image in accordance with an operation of a photographer;

a first display processing unit configured to display the image shot by the image pickup unit in accordance with an instruction by the instruction unit;

an obtaining unit configured to obtain position information input by the photographer with respect to the image displayed by the first display processing unit;

a second display processing unit configured to display options based on the position information obtained by the obtaining unit; and an assistance unit configured to perform an assistance including at least one of setting of a parameter for next shooting and guidance display of a parameter related to shooting based on an option selected by the photographer from among the options displayed by the second display processing unit, wherein, in response to a position indicated by the position information obtained by the obtaining unit not being at a distance within a threshold from a face detected from the image displayed by the first display processing unit and also being within a rectangular frame obtained by dividing the image displayed by the first display processing unit by a golden ratio, the second display processing unit displays an option for setting a focus adjustment position to be at a position based on the position indicated by the position information obtained by the obtaining unit, wherein the golden ratio is 1:0.6, wherein a ratio of a length between a center of a rectangular image and an upper end of the rectangular image to a length between the center of the rectangular image and an upper side of the rectangular frame is 1:0.6, wherein a ratio of a length between the center of the rectangular image and a lower end of the rectangular image to a length between the center of the rectangular image and a lower side of the rectangular frame is 1:0.6, wherein a ratio of a length between the center of the rectangular image and a left end of the rectangular image to a length between the center of the rectangular image and a left side of the rectangular frame is 1:0.6, and wherein a ratio of a length between the center of the rectangular image and a right end of the rectangular image to a length between the center of the rectangular image and a right side of the rectangular frame is 1:0.6.

* * * * *